(12) United States Patent
Matsuda et al.

(10) Patent No.: US 9,216,460 B2
(45) Date of Patent: Dec. 22, 2015

(54) COOLANT-HOLE EQUIPPED DRILL

(75) Inventors: Nobuyuki Matsuda, Anpachi-gun (JP);
Hiroyuki Higashi, Anpachi-gun (JP);
Koichiro Naruke, Anpachi-gun (JP);
Tadashi Yamamoto, Anpachi-gun (JP);
Kazuya Yanagida, Anpachi-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 364 days.

(21) Appl. No.: 13/377,617

(22) PCT Filed: Jun. 15, 2010

(86) PCT No.: PCT/JP2010/003976
§ 371 (c)(1),
(2), (4) Date: Dec. 12, 2011

(87) PCT Pub. No.: WO2010/146839
PCT Pub. Date: Dec. 23, 2010

(65) Prior Publication Data
US 2012/0082524 A1   Apr. 5, 2012

(30) Foreign Application Priority Data

| Jun. 15, 2009 | (JP) | 2009-142441 |
| Apr. 16, 2010 | (JP) | 2010-095374 |
| Apr. 16, 2010 | (JP) | 2010-095375 |
| Apr. 16, 2010 | (JP) | 2010-095376 |

(51) Int. Cl.
*B23B 51/06* (2006.01)
*B23B 51/04* (2006.01)

(52) U.S. Cl.
CPC ............. *B23B 51/06* (2013.01); *B23B 51/0486* (2013.01); *B23B 2222/80* (2013.01); *B23B 2251/406* (2013.01); *Y10T 408/455* (2015.01)

(58) Field of Classification Search
CPC .......................... B23B 51/06; B23B 51/0486
USPC ............................. 408/57, 59, 230, 227, 229
See application file for complete search history.

(56) References Cited

U.S. PATENT DOCUMENTS 465,392 A * 12/1891 Shippee ........................ 408/230
580,398 A *  4/1897 Hoenscheid ................... 408/59

(Continued)

FOREIGN PATENT DOCUMENTS

| CN | 1373694 A | 10/2002 | |
| DE | 102008049508 A1 * | 3/2010 | ............. B23B 51/02 |

(Continued)

OTHER PUBLICATIONS

Notice of Allowance dated Oct. 11, 2013, issued for the Korean patent application No. 10-2013-7019611 and English translation thereof.

(Continued)

*Primary Examiner* — Sunil K Singh
*Assistant Examiner* — Ryan Rufo
(74) *Attorney, Agent, or Firm* — Locke Lord LLP

(57) ABSTRACT

A coolant-hole equipped drill includes a drill main body, a cutting edge portion which has a tip flank, a chip discharging groove provided with a front groove wall surface and a rear groove wall surface, a cutting edge formed at a ridge line portion where the front groove wall surface and the tip flank intersect with each other, a land portion formed between the chip discharging grooves adjacent to each other in the rotating direction, and a coolant hole drilled at the land portion and opened at the tip flank. The coolant hole includes a front hole wall surface, a rear hole wall surface, and an outer-circumference hole wall surface.

4 Claims, 19 Drawing Sheets

(56) References Cited

U.S. PATENT DOCUMENTS

| | | | | |
|---|---|---|---|---|
| 1,208,164 A * | 12/1916 | Kelly | | 408/59 |
| 2,405,298 A * | 8/1946 | Fleischer | | 76/108.6 |
| 2,541,849 A * | 2/1951 | Villeneuve | | 76/108.6 |
| 3,237,488 A * | 3/1966 | Parone et al. | | 408/230 |
| 4,826,364 A * | 5/1989 | Grunsky | | 408/59 |
| 7,134,813 B2 * | 11/2006 | Kleiner | | 408/59 |
| 7,306,411 B2 * | 12/2007 | Mabuchi et al. | | 408/230 |
| 2006/0006576 A1 * | 1/2006 | Karos | | 264/209.2 |
| 2010/0272531 A1 * | 10/2010 | Shavit | | 408/59 |

FOREIGN PATENT DOCUMENTS

| | | | | |
|---|---|---|---|---|
| JP | 59-171010 U | 11/1984 | | |
| JP | 63-062604 A | 3/1988 | | |
| JP | 64-042816 U | 3/1989 | | |
| JP | 02-117811 U | 9/1990 | | |
| JP | 05-293709 A | 11/1993 | | |
| JP | 2005-177891 A * | 7/2002 | | B23B 51/00 |
| JP | 2003-117710 A | 4/2003 | | |
| JP | 2004-154883 A | 6/2004 | | |
| JP | 2004-195559 A * | 7/2004 | | B23B 51/00 |
| JP | 2005-052940 A | 3/2005 | | |
| JP | 2005-177891 A | 7/2005 | | |
| JP | 2006-510494 A | 3/2006 | | |
| JP | 2009-255209 A | 11/2009 | | |
| KR | 20-0368074 Y1 | 11/2004 | | |
| KR | 20-0387299 Y1 | 6/2005 | | |

OTHER PUBLICATIONS

International Search Report dated Aug. 10, 2010, issued for PCT/JP2010/003976.

Office Action mailed on Jan. 3, 2014 for corresponding Chinese Patent Application No. 201080025418.8.

* cited by examiner

COOLANT-HOLE EQUIPPED DRILL

TECHNICAL FIELD

The present invention relates to a coolant-hole equipped drill in which a coolant hole for supplying coolant such as cutting oil is formed at a cutting edge portion at a tip portion of a drill main body for boring work.

Priorities are claimed on Japanese Patent Application No. 2009-142441 filed on Jun. 15, 2009, as well as Japanese Patent Application No. 2010-095374, Japanese Patent Application No. 2010-095375 and Japanese Patent Application No. 2010-095376 filed on Apr. 16, 2010, and the contents of which are incorporated herein by reference.

BACKGROUND ART

In a coolant-hole equipped drill, a coolant hole is in general formed so as to have a circular cross section. In order to supply coolant in an increased amount and in an effective manner, for example, Patent Document 1 has proposed a coolant-hole equipped drill in which an axial cross section of the coolant hole is formed in such a droplet shape that the distance between the inner wall surfaces is gradually decreased from the approximate center of the coolant hole to the center of rotation. Patent Document 2 discloses a drill in which the axial cross section of the coolant hole is formed in an oval shape. Patent Document 3 discloses a drill in which at least an opening portion of the coolant hole is formed substantially in a triangular shape.

In the above-described coolant-hole equipped drills, for example, Patent Documents 4 to 6 have proposed ones in which three margin portions consisting of a first margin portion to a third margin portion are formed on an outer circumferential surface of a land portion between a pair of chip discharging grooves on an outer circumferential surface of a cutting edge portion. In the triple margin-type drills, the three margin portions guide the cutting edge portion stably to the hole-to-be-bored, thus making it possible to conduct highly accurate boring work.

PRIOR TECHNICAL DOCUMENTS

Patent Documents

[Patent Document 1] Japanese Published Unexamined Utility Model Application Sho 64-42816
[Patent Document 2] Japanese Published Unexamined Patent Application No. 2004-154883
[Patent Document 3] Japanese Published Unexamined Patent Application No. 2005-52940
[Patent Document 4] Japanese Published Unexamined Utility Model Application Sho 59-171010
[Patent Document 5] Japanese Published Unexamined Utility Model Application Hei 2-117811
[Patent Document 6] Japanese Published Unexamined Patent Application No. 2005-177891

SUMMARY OF THE INVENTION

Problems to be Solved by the Invention

Actually, in the above-described coolant-hole equipped drills, coolant can be supplied in an increased amount by enlarging the cross sectional area of the coolant hole. However, where the cross sectional area is enlarged unnecessarily, the drill main body may be reduced in strength to cause breakage. For example, the drill disclosed in Patent Document 1 is formed in such a manner that the cross section of the coolant hole gives a droplet shape. That is, the coolant hole is made up with a primary hole and a secondary hole. The primary hole is formed so as to have a circular cross section. The secondary hole is in contact with the circular arc of the primary hole and provided with two flat inner wall surfaces which intersect with each other on the side closer to the center of rotation. Regarding the coolant hole, where the primary hole is equal in cross sectional area, a distance between the two inner wall surfaces of the secondary hole is gradually decreased toward the center of rotation, and if a percentage for decreasing the distance is made smaller, an acute angle formed between two flat surfaces including the inner wall surfaces is made smaller. Then, the coolant hole is increased in cross sectional area. However, an interval between the inner wall surface and the wall surface of the chip discharging groove is decreased to reduce the thickness of the drill main body, thus resulting in reduction in strength of the drill main body.

This is also true for the coolant-hole equipped drill disclosed in Patent Document 2 in which the coolant hole is formed so as to have an oval cross section. That is, in Patent Document 2, a ratio of long axis to short axis in the oval shape is from 1.2:1.0 or more to 4.0:1.0 or less. The Document has also described that the long axis direction of the oval shape is kept in a range from substantially parallel to the cutting edge to 45° or less backward in the rotating direction. For example, where the long axis is equal in length, the ratio of the long axis to the short axis (the long-axis to short-axis ratio) is decreased in an attempt to increase the cross sectional area of the coolant hole. Then, the inner wall surface of the coolant hole and the wall surface of the chip discharging groove are decreased in thickness in the short axis direction, thus resulting in easy breakage. In contrast, where the ratio of long axis to short axis is increased, the position of the coolant hole in the circumferential direction (the rotating direction of the drill main body) at the tip flank is limited to the range of the above angle. As a result, there is also a problem that coolant flows lopsidedly to the cutting edge side or to the heel side.

Further, in the drill disclosed in Patent Document 3 in which the coolant hole is formed substantially in a triangular shape, the triangle has a certain height toward the heel side, with the cutting edge side given as a base. The triangle is in a flat shape, with a ratio of height to base being 0.4 or more to 0.6 or less. Still further, the base is provided so as to be substantially parallel to the cutting edge or at 45° from the cutting edge backward in the rotating direction. Therefore, coolant inevitably flows in a lopsided manner. In addition, the base is required to be longer in order to increase the cross sectional area of the coolant hole. Thus, an attempt to supply the coolant in an increased amount is self-limiting. Therefore, for example, when a difficult cutting material which is low in heat conductivity such as stainless steel is bored, it is not able to sufficiently lubricate and cool a cut site and the cutting edge. As a result, these conventional coolant-hole equipped drills are required to be decreased in feeding and are difficult to use in efficient boring work.

The present invention has been made under the above-described circumstances, and a first object of the present invention is to provide a coolant-hole equipped drill which is capable of reliably supplying coolant in an increased amount without reduction in strength of a drill main body and also capable of efficient and stable boring of a difficult cutting material such as stainless steel.

As described above, the coolant hole may be increased in its cross sectional area in order to supply coolant in an increased amount in the coolant-hole equipped drill. However, a mere increase in cross sectional area will not allow the coolant whose supply amount has been increased to supply efficiently. It is, in particular, difficult to efficiently supply the coolant to a cutting edge on an outer circumferential side which is large in radius of rotation from an axis line and also large in chip production amount, cutting loads and heat generation during cutting work and also to a site of a workpiece cut by the cutting edge on the outer circumferential side.

That is, as described above, in the drill disclosed in Patent Document 1 in which the coolant hole is formed so as to give a droplet-shape cross section, an interval between two wall surfaces of the secondary hole in the circumferential direction (the rotating direction of the drill main body) is gradually increased toward the outer circumferential side. However, an increasing percentage thereof (an increasing rate) is constant toward the outer circumferential side. Therefore, coolant is not able to be supplied efficiently to the outer circumferential side. As a result, it is not able to attain a sufficient cooling effect to a workpiece which is low in heat conductivity such as stainless steel.

This is also true for the drill disclosed in Patent Document 3 in which an opening portion of the coolant hole is formed to give a substantially triangular-shape in cross section. In the drill of Patent Document 3, the base of the triangle is formed substantially parallel to a tip cutting edge or at 45° from the tip cutting edge backward in the rotating direction. In the drill disclosed in Patent Document 2, the long axis direction of the coolant hole formed in an oval shape is kept in a range from substantially parallel to a drill cutting edge to 45° or less from the drill cutting edge backward in the rotating direction. Then, the opening portion of the coolant hole is gradually decreased in width in the circumferential direction (the rotating direction of the drill main body) on the outer circumferential side. As a result, it is more difficult to supply coolant efficiently.

The present invention has been made under these circumstances. A second object thereof is to provide a coolant-hole equipped drill which is capable of efficiently supplying coolant in a greater amount to an outer circumferential site of a cutting edge large in chip production amount, cutting loads and heat generation during cutting and also to an outer circumferential cut site of a hole-to-be-bored on a workpiece cut by an outer circumferential portion of the cutting edge.

Moreover, in the above-described coolant-hole equipped drill, coolant such as cutting oil supplied from the coolant hole cools and lubricates the cutting edge at the tip of the cutting edge portion and a cut site on a hole-to-be-bored by the cutting edge, thereafter flowing into a chip discharging groove. The coolant which has flowed into the chip discharging groove pushes out chips within the chip discharging groove to the base end side of the drill main body through the hole-to-be-bored. Further, the coolant which has flowed into the chip discharging groove also flows from the tip flank between each body clearance among the first to the third margin portions on an outer circumferential surface of the land portion on the outer circumferential side and an inner circumferential surface of the hole-to-be-bored. Then, the coolant cools and lubricates each of the margin portions and the inner circumferential surface of the hole-to-be-bored on which these margin portions are in slide contact therewith.

However, for the drills disclosed in Patent Document 4 and Patent Document 6 among the Patent Documents 4 through 6, thinning is performed to the inner circumferential portion of the cutting edge. Then, a part of the tip surface of the cutting edge portion backward in the drill rotating direction is notched by a thinning surface resulting from the thinning from the center of drill rotation to the heel of the land portion. Thus, the part of the tip surface of the cutting edge portion backward in the drill rotating direction is inclined so as to move backward to the base end side of the drill main body with respect to the tip flank. Then, among the first, the second and the third margin portions, the third margin portion which is positioned at the most backward in the drill rotating direction on the outer circumferential surface of the land portion continues in such a manner that the tip thereof intersects with the thinning surface which is inclined so as to move backward.

Therefore, coolant which has been ejected and supplied from the coolant hole mostly flows into the chip discharging groove from a space between the hole bottom of the hole-to-be-bored and the thinning surface inclined so as to move backward, before the coolant flows in between the body clearance between the second margin portion and the third margin portion and the inner circumferential surface of the hole-to-be-bored. Thus, the coolant is not able to be sufficiently supplied between the body clearance between the second margin portion and the third margin portion and the inner circumferential surface of the hole-to-be-bored. Thereby, in particular, the third margin portion wears out in a considerably accelerated manner. As a result, boring work may be decreased in accuracy, for example, the cutting edge portion may be reduced in guidance property to cause a change in enlargement allowance of the hole-to-be-bored. Further, the tip of the third margin portion is positioned on the thinning surface which is inclined so as to move backward to the base end side of the drill main body. In this case, no sufficient guidance property can be obtained until the tip of the third margin portion inclined so as to move backward is in slide contact with the inner circumferential surface of the hole-to-be-bored. Therefore, it is also difficult to prevent vibration of the cutting edge portion at contacting.

On the other hand, Patent Document 5 has disclosed the drill in which a cemented carbide tip is installed at a tip portion of a steel shank to form a cutting edge. A coolant hole of the drill is formed on the steel shank along the center axis line of the drill. Further, the coolant hole is branched at the cemented carbide tip and opened at the tip flank thereof. Therefore, particularly in a twisted drill in which a chip discharging groove is twisted helically, there are restrictions on the position at which the coolant hole is opened at the tip flank.

There is a case that, with respect to the restricted position at which the coolant hole is opened at the tip flank, the second margin portion between the first margin portion on the cutting edge side and the third margin portion on the heel side is positioned lopsidedly in the circumferential direction (the rotating direction of the drill main body). In this case, coolant which has been ejected from the coolant hole is supplied lopsidedly between the body clearance between the first margin portion and the second margin portion among the first to the third margin portions and an inner circumferential surface of a hole-to-be-bored. Alternatively, the coolant is supplied lopsidedly between the body clearance between the second margin portion and the third margin portion and the inner circumferential surface of the hole-to-be-bored. Therefore, there is a possibility that the coolant may not be supplied sufficiently between one of the body clearances and the inner circumferential surface of the hole-to-be-bored. Wear is accelerated at a margin portion which is positioned backward in the drill rotating direction on a body clearance to which the coolant is not sufficiently supplied, resulting in a reduction in accuracy of boring work.

The present invention has been made under these circumstances, and a third object thereof is to provide, as described above, a coolant-hole equipped drill capable of securing the stable guidance property of a cutting edge portion to prevent a change in enlargement allowance, thereby performing highly accurate boring work in the coolant-hole equipped drill based on the following (1) to (3).

(1) Where the first to the third margin portions are formed, vibration of the cutting edge portion at contacting is suppressed.

(2) A sufficient amount of coolant is supplied evenly and reliably between the body clearance between the first margin portion and the second margin portion and an inner circumferential surface of a hole-to-be-bored as well as between the body clearance between the second margin portion and the third margin portion and the inner circumferential surface of the hole-to-be-bored, during boring work.

(3) Wear is suppressed not only at the first margin portion but also at the second and the third margin portions.

Means for Solving the Problem

In order to attain the first object, the present invention is provided with a cutting edge portion at a tip side of a drill main body which rotates around an axis line. On an outer circumference of the cutting edge portion, there is formed a chip discharging groove which is opened at a tip flank of the drill main body to extend toward the base end side in the direction of the axis line, while being twisted around the axis line. A cutting edge is formed at an intersecting ridge line portion between a front groove wall surface facing forward in the chip discharging groove in the drill rotating direction and the tip flank. A coolant hole which is opened at the tip flank while being twisted parallel to the chip discharging groove is drilled at a land portion formed at the cutting edge portion between the chip discharging grooves adjacent to each other in the circumferential direction. This coolant hole is provided on a cross section orthogonal to the axis line with a front hole wall surface which is positioned forward in the drill rotating direction and constant in interval with the front groove wall surface, a rear hole wall surface which is positioned backward in the drill rotating direction and constant in interval with the rear groove wall surface of the chip discharging groove facing backward in the drill rotating direction, and an outer-circumference hole wall surface which is positioned on the outer circumferential side of the drill main body and constant in interval with the outer-circumference wall surface of the land portion.

In the thus configured coolant-hole equipped drill, the front hole wall surface, the rear hole wall surface and the outer-circumference hole wall surface which form the coolant hole have constant intervals respectively with the front groove wall surface and the rear groove wall surface of the chip discharging groove which form the land portion and the outer-circumference wall surface of the land portion. Therefore, the wall portions formed between the wall surfaces are made constant in thickness accordingly to avoid the formation of a part which is thin in wall thickness, thus making it possible to secure the strength of the drill main body at the cutting edge portion. As a result, it is possible to prevent breakage of the drill main body and promote stable boring work.

Then, with the strength of the drill main body being kept, each of the hole wall surfaces extends along each of the groove wall surfaces and the outer-circumference wall surface. It is, therefore, possible to supply coolant in an increased amount by enlarging the cross sectional area of the coolant hole. Further, an interval between the front hole wall surface of the coolant hole and the cutting edge at the tip flank, an interval between the rear hole wall surface and the rear groove wall surface on the heel side, and an interval between the outer-circumference hole wall surface and the outer-circumference wall surface of the land portion are respectively made constant. Therefore, the coolant can be supplied impartially and evenly. As a result, it is possible to supply the coolant between the bottom surface of a hole-to-be-bored and the tip flank impartially and in a greater amount. It is also possible to effectively lubricate and cool a cut site and the cutting edge and also smoothly discharge chips.

Further, in the thus configured coolant-hole equipped drill, the interval between the outer-circumference hole wall surface and the outer-circumference wall surface is made larger than the interval between the front hole wall surface and the front groove wall surface and the interval between the rear hole wall surface and the rear groove wall surface. It is, thereby, possible to reliably make the land portion thicker on the outer circumferential side and further improve the strength of the drill main body. The interval between the outer-circumference hole wall surface and the outer-circumference wall surface is preferably in a range of 5% or more and 20% or less with respect to an outer diameter of the cutting edge. Where the interval is smaller than the range, a part between the outer-circumference hole wall surface and the outer-circumference wall surface is made thinner, thus resulting in a failure of securing sufficient strength. On the other hand, where the interval is larger than the range, there is the possibility of not being able to make the cross sectional area of the coolant hole sufficiently large.

Still further, an interval between the front hole wall surface and the front groove wall surface is equal is made equal to an interval between the rear hole wall surface and the rear groove wall surface. Thereby, a wall portion of the land portion forward in the drill rotating direction is made equal in thickness to a wall portion thereof backward in the drill rotating direction to keep the strength in balance, thus making it possible to prevent breakage, and so on, as well. In addition, coolant can be dispersed to the cutting edge side and the heel side substantially evenly at the tip flank, by which the coolant can be supplied impartially. In order to increase the cross sectional area of the coolant hole while the wall portions of the land portion forward and backward in the drill rotating direction are kept sufficiently strong, it is preferable that the interval between the front hole wall surface and the front groove wall surface and the interval between the rear hole wall surface and the rear groove wall surface are in a range of 3% or more and 15% or less with respect to the outer diameter of the cutting edge.

In addition, the front and the rear hole wall surfaces of the coolant hole which are respectively constant in intervals with the front and the rear wall surfaces of the chip discharging groove also extend to the axis line side of the drill main body, that is, to the inner circumferential side so as to run along the front and the rear wall surfaces. For example, there is a case where a plurality of coolant holes are formed at the cutting edge portion. In this case, when inner circumferential ends of the coolant holes come too close to the axis line, intervals between the inner circumferential ends of the coolant holes are made excessively small, resulting in the possibility of making it difficult to secure the strength. On the other hand, where the intervals are made excessively large, there is also a possibility that the coolant hole cannot be increased in cross sectional area. Therefore, the interval between the axis line and the coolant hole is preferably in a range of 5% or more and 25% or less with respect to the outer diameter of the cutting edge as an interval between the inner circumferential ends of the coolant hole on the cross section orthogonal to the axis line.

On the other hand, even if the front hole wall surface, the rear hole wall surface and the outer-circumference hole wall surface of the coolant hole are respectively constant in intervals with the front groove wall surface, the rear groove wall surface and the outer-circumference wall surface of the land portion, there is a possibility that it may be difficult to secure coolant supply in a sufficient amount when the coolant hole is excessively small. In contrast, there is the possibility of not being able to keep the strength of the drill main body if the coolant hole is excessively large. Therefore, it is preferable that the coolant hole has the width which is in a range of 5% or more and 35% or less with respect to the outer diameter of the cutting edge in the radial direction with respect to the axis line (the radial direction of a circle which has a point set as the center on the axis line on the cross section orthogonal to the axis line). Further, in the circumferential direction (the circumferential direction of a circle which has a point set as the center on the axis line on the cross section orthogonal to the axis line, the circumferential direction of the drill main body, or the rotating direction of the drill main body), an included angle formed by the front hole wall surface and the rear hole wall surface (an acute angle between these surfaces) on the cross section orthogonal to the axis line is preferably in a range of 50% or more and 80% or less with respect to an included angle formed by a straight line which connects an intersection point of the front groove wall surface and the outer-circumference wall surface of the land portion with the axis line and a straight line which connects an intersection point of the rear groove wall surface and the outer-circumference wall surface of the land portion with the axis line.

In order to attain the second object, in the present invention, a coolant hole which is opened at the tip flank of a cutting edge portion is drilled at the cutting edge portion formed at a tip side of a drill main body which is rotated around the axis line. The coolant hole is provided on the cross section orthogonal to the axis line with a front hole wall surface which is positioned forward in the drill rotating direction, a rear hole wall surface which is positioned backward in the drill rotating direction and an outer-circumference hole wall surface which is positioned on an outer circumferential side of the drill main body. Of these wall surfaces, the front hole wall surface and the rear hole wall surface are formed in such a manner that a gap (an interval) between the front hole wall surface and rear hole wall surface in the circumferential direction is gradually increased toward the outer circumferential side and a percentage for increasing the gap is also gradually increased toward the outer circumferential side.

In the thus configured coolant-hole equipped drill, a gap between the front hole wall surface of the coolant hole and the rear hole wall surface thereof in the circumferential direction is also gradually increased toward the outer circumferential side. Further, a percentage for increasing the gap is also gradually increased toward the outer circumferential side. For example, where two flat wall surfaces of the secondary hole extend, as they do, to the outer circumferential side in the drill disclosed in Patent Document 1, a gap between the inner wall surfaces is increased at a constant percentage to the outer circumferential side. On the other hand, according to the present invention, it is possible to further increase the gap between the front and the rear hole wall surfaces on the outer circumferential side.

Therefore, it is also possible to supply a greater amount of coolant which passes through the gap between the front and the rear hole wall surfaces at the outer circumferential side. In the drill which is fed to the tip side in the direction of the axis line, with the main body being rotated around the axis line, to bore a workpiece, centrifugal force also acts on coolant supplied through the coolant hole toward the outer circumferential side. Therefore, the coolant which can be supplied in an increased amount on the outer circumferential side can be accelerated and ejected at greater speeds from an opening portion at the tip flank. As a result, it is possible to supply the coolant efficiently and broadly to the cutting edge on the outer circumferential side and a cut site of a hole-to-be-bored.

Here, a gap between the front and the rear hole wall surfaces of the coolant hole in the circumferential direction is gradually increased toward the outer circumferential side, and a percentage for increasing the gap is also gradually increased toward the outer circumferential side. For this purpose, on the cross section orthogonal to the axis line of the drill main body, at least one of the front and the rear hole wall surfaces may be formed in a raised curve which is convex inside the coolant hole. The other of them may be formed in a straight line on the same cross section or may be formed in a recessed curve which is concave outside the coolant hole in a range where the percentage of the gap is gradually increased toward the outer circumferential side. The front hole wall surface and the rear hole wall surface are both formed so as to give a raised curve cross section which is convex inside the coolant hole, thereby it is possible to supply coolant broadly in a wider range forward in the drill rotating direction and backward in the drill rotating direction on the outer circumferential side of the drill main body.

Further, the outer-circumference hole wall surface of the coolant hole may be formed, for example, in a straight line on the cross section orthogonal to the axis line, if the gap between the front and the rear hole wall surfaces which has been increased on the outer circumferential side is not narrowed. The outer-circumference hole wall surface is formed in a recessed curve which is concave outside the coolant hole on the cross section orthogonal to the axis line, thus making it possible to evenly and broadly supply the coolant which has been supplied in a greater amount, in particular on the outer circumferential side to a cut site of a hole-to-be-bored on the outer circumferential side. It is preferable that, for the purpose of preventing occurrence of cracks, and so on, a ridge line portion where the outer-circumference hole wall surface and the front or the rear hole wall surfaces intersect with each other (an intersecting ridge line portion), and a part where the front hole wall surface and the rear hole wall surface intersect with each other (an intersecting ridge line portion) are connected smoothly by a recessed curve portion formed in a recessed curve having a small curvature radius in a cross section thereof.

On the other hand, on the cross section orthogonal to the axis line, the percentage (the increasing rate) for increasing the gap (the interval) between the front hole wall surface and the rear hole wall surface in the circumferential direction will be the same as a case where the two flat wall surfaces of the secondary hole in the drill disclosed in Patent Document 1 extend, as they do, to the outer circumferential side, if the percentage is excessively small. Then, there is the possibility of not being able to supply the coolant in a sufficiently increased amount at the outer circumferential side. However, if the percentage (the increasing rate) is excessively large, the inner wall surface of the coolant hole is made longer in circumferential length on the cross section orthogonal to the axis line to result in large pressure loss. Thereby, there is a possibility that the pressure of ejecting the coolant from an opening portion of the coolant hole on the tip flank may be reduced to result in not being able to efficiently supply the coolant. Therefore, it is preferable that the percentage for increasing the gap between the front hole wall surface and the rear hole wall surface in the circumferential direction is increased by 130% or more and 190% or less with every increase of 1 mm toward the outer circumferential side in the radial direction with respect to the axis line.

In order to attain the third object, in the present invention, a plurality of chip discharging grooves are formed on an outer circumference of a cutting edge portion at a drill main body which rotates around the axis line. Then, a cutting edge which is subjected to thinning at an inner circumferential portion thereof is formed at an intersecting ridge line portion between a front groove wall surface of the chip discharging groove facing forward in the drill rotating direction and a tip flank of the cutting edge portion. A thinning surface resulting from the thinning is formed at the tip flank backward in the drill rotating direction so as to move backward to the base end side of the drill main body with respect to the tip flank. Then, a coolant hole to be opened at the tip flank is drilled at the cutting edge portion. Further, on an outer-circumference wall surface of the land portion between the chip discharging grooves adjacent to each other in the circumferential direction, there are formed a first margin portion on the side of the cutting edge, a second margin portion backward in the drill rotating direction of the first margin portion and a third margin portion on the heel side which is further backward in the drill rotating direction of the second margin portion, with an interval kept in the circumferential direction. Of these margin portions, the second margin portion intersects with the tip flank between two straight lines which pass through the axis line and circumscribe an opening portion of the coolant hole so as to hold the opening portion in the circumferential direction when viewed from the tip side in the direction of the axis line. In addition, in the third margin portion, at least a part thereof in the drill rotating direction intersects with the tip flank which is forward from the thinning surface in the drill rotating direction.

In the thus configured coolant-hole equipped drill, the cutting edge is subjected to thinning by which the thinning surface resulting from the thinning is formed at the tip flank backward in the drill rotating direction. Even in such a case, in the third margin portion, at least a part thereof forward in the drill rotating direction intersects with the tip flank with which the second margin portion forward from the thinning surface in the drill rotating direction intersects. Therefore, coolant which has been supplied through the coolant hole opened at the tip flank can also be made to flow reliably and sufficiently between the body clearance between the second and the third margin portions and an inner circumferential surface of a hole-to-be-bored, before the coolant flows into the chip discharging grooves from the thinning surface which has moved backward. As a matter of course, the coolant also flows in between the body clearance between the first and the second margin portions in the drill rotating direction and the inner circumferential surface of the hole-to-be-bored.

Further, the third margin portion intersects with the tip flank before the tip flank moves backward to the base end side of the drill main body by the thinning surface. It is, thereby, possible to shorten the distance from a site at which the cutting edge portion contacts a workpiece to a site at which the third margin portion is in slide contact with the inner circumferential surface of the hole-to-be-bored. Thus, it is also possible to suppress vibration occurring when the cutting edge portion contacts the workpiece.

Then, the second margin portion further intersects with the tip flank between two straight lines which pass through the axis line and circumscribe the opening portion of the coolant hole so as to hold the opening portion in the circumferential direction, when viewed from the tip side of the drill main body in the direction of the axis line. Therefore, coolant which ejects from the opening portion of the coolant hole to flow along the outer circumferential side can be dispersed evenly and allowed to flow between the first and the second margin portions and between the second and the third margin portions with the second margin interposed therebetween.

Therefore, according to the thus configured coolant-hole equipped drill, the coolant is allowed to flow in reliably and sufficiently between the body clearance between the second and the third margin portions and the inner circumferential surface of the hole-to-be-bored, as described above. Further, as supplied between the second and the third margin portions and the inner circumferential surface of the hole-to-be-bored, the coolant is supplied evenly between the body clearance between the first and the second margin portions and the inner circumferential surface of the hole-to-be-bored. Therefore, it is possible to suppress wear of the first, the second and the third margin portions and also reliably secure the guidance property of the cutting edge portion over a prolonged period of time. Thus, it is possible to prevent a change in enlargement allowance of the hole-to-be-bored (a difference between a tool diameter and a diameter of a bored hole in boring work) and stably perform highly accurate boring work.

Here, regarding the width of the first, the second and the third margin portions in the circumferential direction (the circumferential direction of the tool main body, the rotating direction of the tool main body), it is preferable that the third margin portion is made so as to have the greatest width. Thereby, even if a part of the third margin portion backward in the drill rotating direction intersects with the thinning surface, at least a part thereof forward in the drill rotating direction can be formed so as to reliably intersect with the tip flank which is the same as the second margin portion.

Further, the second margin portion may be made so as to have the smallest width in the circumferential direction among the first, the second and the third margin portions, as long as the width is able to secure necessary guidance property. Where the second margin portion is excessively great in width, the width of a ridge line portion where the second margin portion and the tip flank intersect also becomes great. Then, the ridge line portion blocks the coolant which has flowed from the opening portion of the coolant hole to the outer circumferential side of the tip flank. Then, there is the possibility of making it difficult to smoothly supply the coolant to the body clearance between the second margin portion and the first margin portion and the body clearance between the second margin portion and the third margin portion.

On the other hand, the coolant hole may be formed in a common round-shaped hole which is a circle on the cross section orthogonal to the axis line of the drill main body as disclosed in Patent Documents 1 to 3. On the cross section orthogonal to the axis line, the coolant hole may be provided with a front hole wall surface which is positioned forward in the drill rotating direction, a rear hole wall surface which is positioned backward in the drill rotating direction and an outer-circumference hole wall surface which is positioned on the outer circumferential side of the drill main body. Further, the front hole wall surface and the rear hole wall surface may be formed in such a manner that a gap between them in the circumferential direction is gradually increased toward the outer circumferential side and a percentage for increasing the gap is also gradually increased toward the outer circumferential side. Thereby, it is possible to increase the flow rate of coolant and also to more reliably suppress the wear of the margin portions.

Further, the coolant hole may include the front hole wall surface, the rear hole wall surface and the outer-circumference hole wall surface on the cross section orthogonal to the axis line. Here, the front hole wall surface is positioned forward in the drill rotating direction and constant in interval with the front groove wall surface of the chip discharging groove. Still further, the rear hole wall surface is positioned backward in the drill rotating direction and constant in interval with the rear groove wall surface facing the chip discharging groove backward in the drill rotating direction. In addition, the outer-circumference hole wall surface is positioned on the outer circumferential side of the drill main body and constant in interval with the outer-circumference wall surface (body clearances) excluding the first, the second and the third margin portions of the land portion. It is, thereby, possible to avoid formation of a thin part between each of the hole wall surfaces of the coolant hole, the chip discharging groove and the body clearance. Then, it is possible to secure the strength of the drill main body at the cutting edge portion and also promote stable boring work by preventing the drill main body from breakage, and so on.

The front hole wall surface of the coolant hole and the rear hole wall surface thereof are supposed to be constant in interval respectively with the front groove wall surface of the chip discharging groove and the rear groove wall surface thereof. In this case, on the cross section orthogonal to the axis line, the body clearance is supposed to have a raised curve so as to be convex on the outer circumferential side, and the front and the rear groove wall surfaces of the chip discharging groove are supposed to have a recessed curve so as to be concave backward in the drill rotating direction and forward in the drill rotating direction. If so, as the front hole wall surface and the rear hole wall surface move to the outer circumferential side as described above, a gap (an interval) between them in the circumferential direction is gradually increased. Further, the front hole wall surface and the rear hole wall surface are formed in such a manner that a percentage for increasing the gap (an increasing rate) is gradually increased toward the outer circumferential side. Therefore, it is possible to obtain such effects at the same time that increase the flow rate of the coolant and also secure the strength of the drill at the cutting edge portion.

Effect of the Invention

As so far described, according to the present invention, it is possible to secure sufficient strength of the drill main body while coolant is supplied in an increased amount by enlarging the cross sectional area of the coolant hole. Thereby, for example, when a difficult cutting material which is low in heat conductivity such as stainless steel is bored, it is possible to effectively lubricate and cool a cut site of a hole-to-be-bored and the cutting edge by reliably preventing occurrence of breakage, and so on, during boring work. It is also possible to perform stable and efficient boring work by smoothly discharging chips. Thereby, the first object can be attained.

Further, according to the present invention, it is possible to efficiently supply coolant in a greater amount to an outer circumferential site of the cutting edge which is large in chip production amount in boring work, cutting loads and heat generation during cutting and also to an outer circumferential cut site of a hole-to-be-bored on a workpiece cut by the outer circumferential site of the cutting edge. Therefore, for example, a difficult cutting material which is low in heat conductivity such as stainless steel can be bored stably and efficiently by effectively cooling and lubricating the material and also by discharging chips smoothly. Thereby, the second object can be attained.

Still further, according to the present invention, it is possible to prevent vibration of the cutting edge portion at contacting and also secure the stable guidance property by suppressing wear of the margin portions. It is, thereby, possible to improve the accuracy of boring work and consequently attain the third object.

BEST MODE FOR CARRYING OUT THE INVENTION

There is shown one embodiment of the coolant-hole equipped drill of the present invention in FIG. 1 through FIG. 6. In the present embodiment, a drill main body 11 is integrally formed with a hard material such as cemented carbide. The drill main body 11 is formed so as to give a substantially columnar shape whose center is the axis line O1. The drill main body 11 is provided at a part of the base end side thereof (a right-side part in FIG. 1 and FIG. 2) with a columnar shank portion 12. A cutting edge portion 13 is formed at a tip side of the drill main body 11 (a left-side part in FIG. 1 and FIG. 2).

In the thus configured coolant-hole equipped drill, the shank portion 12 is gripped by a machine tool. The machine tool feeds the coolant-hole equipped drill to the tip side of the drill main body 11 in the direction of the axis line O1, with the drill rotated in the drill rotating direction T1 around the axis line O1, thereby boring a workpiece.

Figure 1:
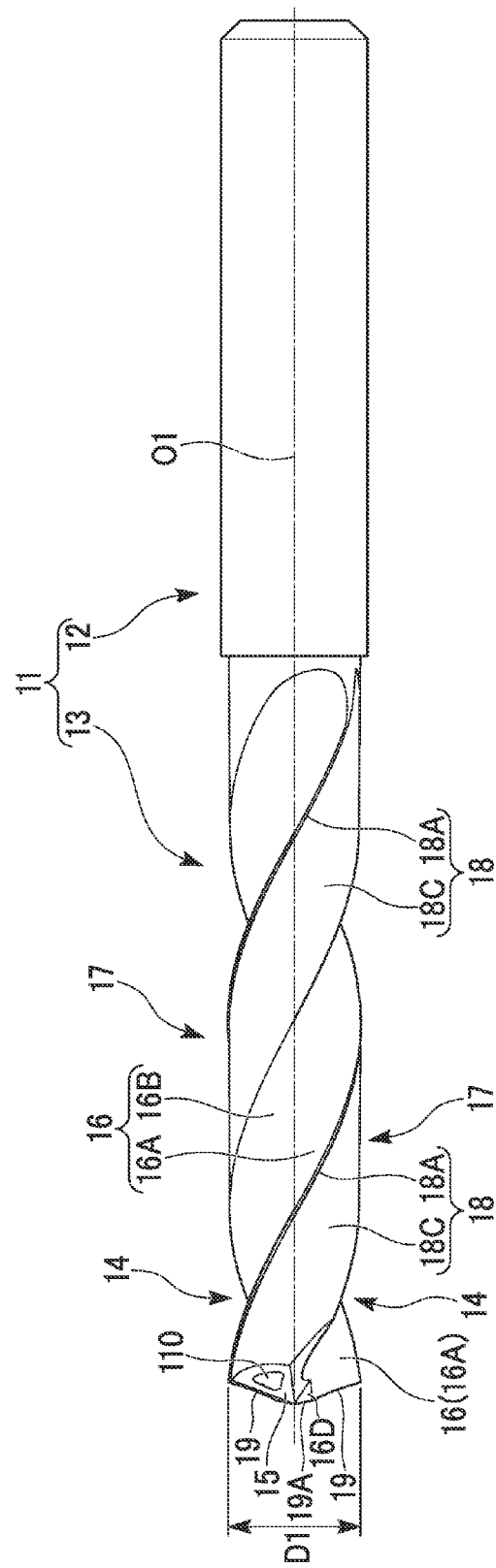
FIG. 1 is a side view which shows one embodiment of the present invention.
Figure 2:
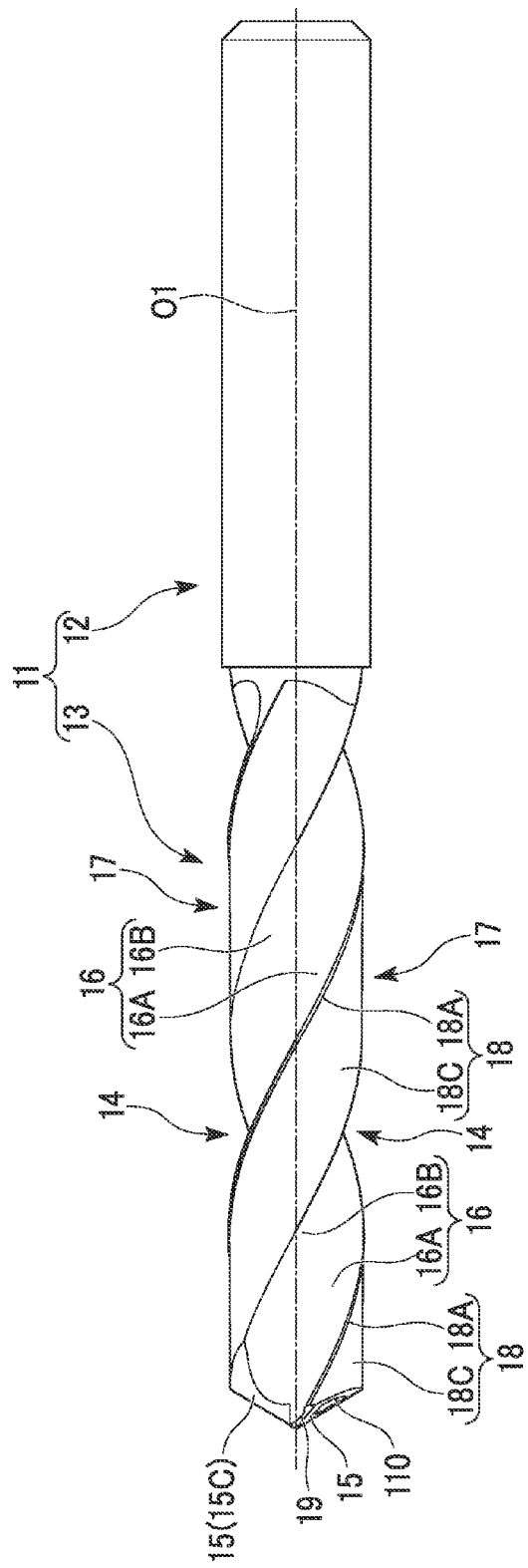
FIG. 2 is a plan view which shows the embodiment given in FIG. 1.
Figure 3:
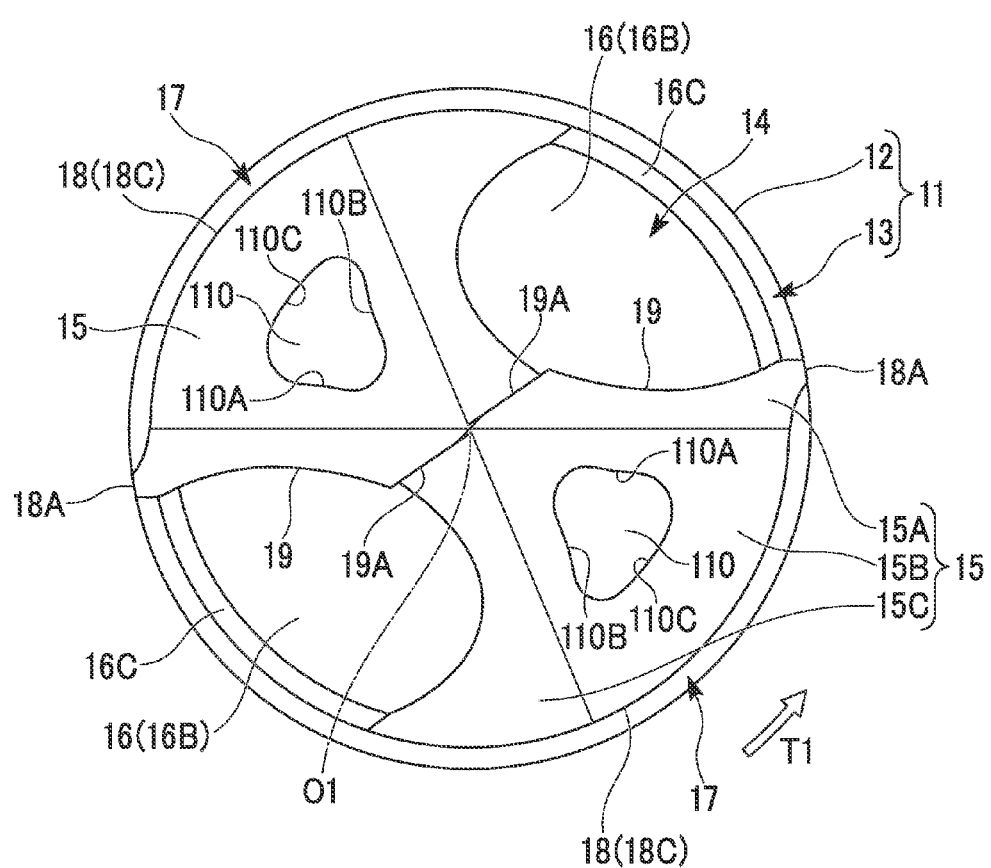
FIG. 3 is a front elevational view which shows the embodiment given in FIG. 1.
Figure 4:
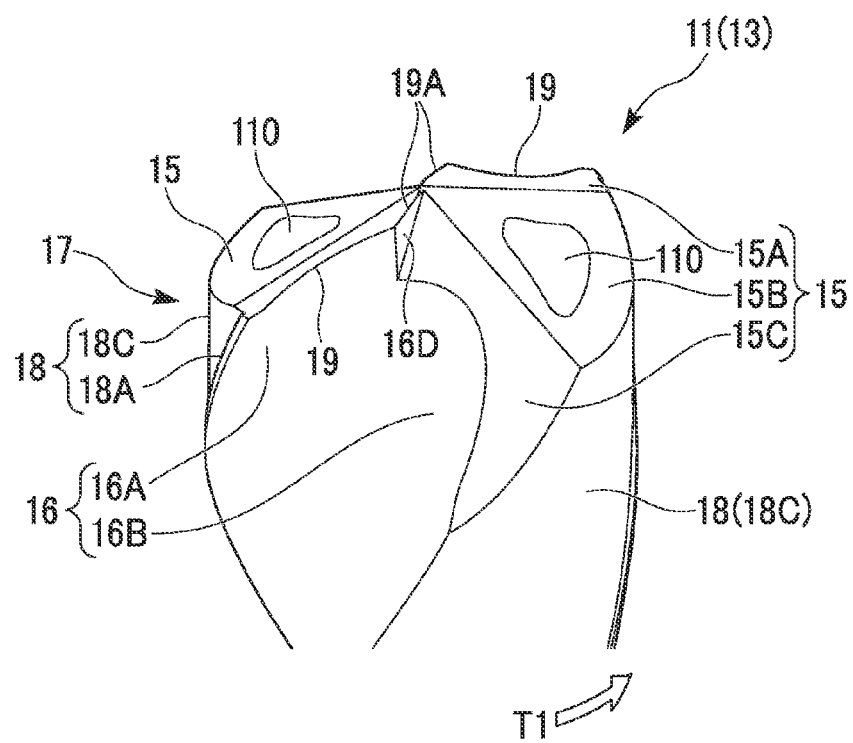
FIG. 4 is a perspective view which shows a tip portion of the embodiment given in FIG. 1.
Figure 5:
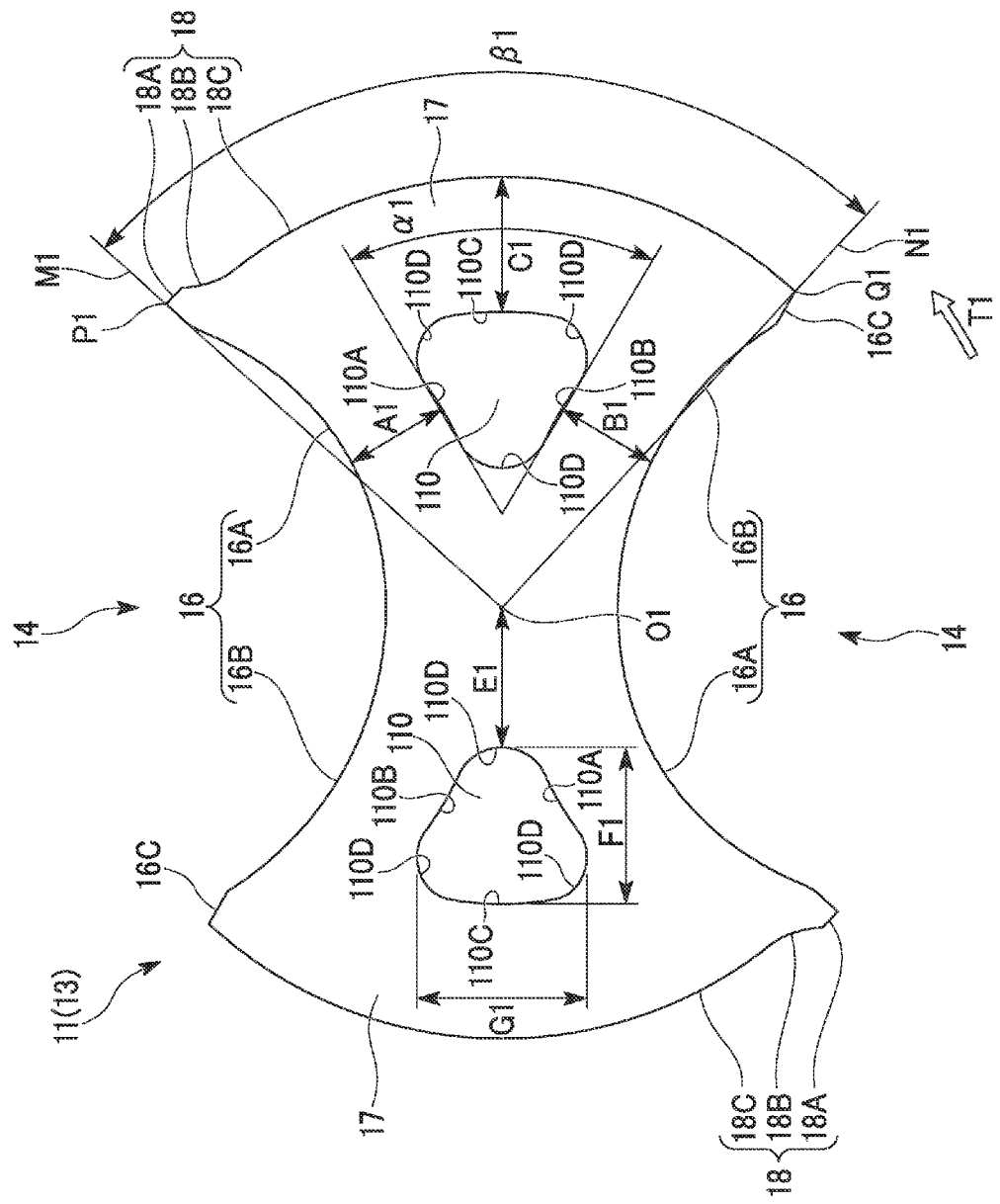
FIG. 5 is a cross sectional view of the embodiment given in FIG. 1 which is orthogonal to an axis line O1.

In the present embodiment, a pair of chip discharging grooves 14 are formed on an outer circumference of the cutting edge portion 13. The chip discharging grooves 14 are provided so as to be symmetrical with each other with respect to the axis line O. The chip discharging grooves 14 are opened on a tip flank 15 of the drill main body 11. The chip discharging grooves 14 extend so as to be twisted backward in the drill rotating direction T1, for example, at a twisted angle of 40° or less around the axis line O1 toward the base end side in the direction of the axis line O1. The chip discharging grooves 14 are formed so as to be cut up toward the outer circumference before the shank portion 12. The chip discharging grooves 14 are formed on the cross section orthogonal to the axis line O1 in such a manner that the cross section of a groove wall surface 16 thereof is formed in a substantially smooth recessed curve as shown in FIG. 5. Regarding the groove wall surface 16, the cross section of a part of a front groove wall surface 16A on the outer circumferential side facing forward in the drill rotating direction T1 is formed in a raised curve smoothly in contact with the recessed curve. On the other hand, a chamfered portion 16C is formed at a part (a heel part) of a rear groove wall surface 16B on the outer circumferential side facing backward in the drill rotating direction T1.

As described above, the pair of chip discharging grooves 14 are formed, by which a pair of land portions 17 are formed between the chip discharging grooves 14 adjacent in the circumferential direction (the rotating direction of the drill main body 11) at the cutting edge portion 13. The land portion 17 is twisted around the axis line O1 backward in the drill rotating direction T1, as with the chip discharging grooves 14. In the present embodiment, an outer-circumference wall surface 18 of the land portion 17 includes a margin portion 18A small in width and an outer circumference flank (a body clearance) 18C which occupies a major part of the outer-circumference wall surface 18. The margin portion 18A is positioned forward in the drill rotating direction T1 and extends so as to form a cylindrical surface whose center is the axis line O1, intersecting with the front groove wall surface 16A to form a leading edge. The outer circumference flank 18C continues to the margin portion 18A backward in the drill rotating direction T1 via a step portion 18B which has a recessed curved-surface. The outer circumference flank 18C forms a cylindrical surface slightly smaller in diameter whose center is the axis line O1 from the margin portion 18A and intersects with the chamfered portion 16C.

In the present embodiment, the tip flank 15 includes three flank portions, that is, a first flank portion 15A, a second flank portion 15B and a third flank portion 15C in which a relief angle is increased in a step-wise manner backward in the drill rotating direction T1. A cutting edge 19 is formed at a ridge line portion where the tip flank 15 and the chip discharging groove 14 intersect with each other. More specifically, the cutting edge 19 is formed at a ridge line portion (an intersecting ridge line portion) where the first flank portion 15A of the tip flank 15 forward in the drill rotating direction T1 intersects with a tip side part of the front groove wall surface 16A of the chip discharging groove 14. A thinning surface 16D is formed at an inner circumferential portion which is a part of the tip side of the front groove wall surface 16A. The thinning surface 16D intersects with the third flank portion 15C of the tip flank 15 backward in the drill rotating direction T1 so as to form a recessed V-letter shape. The cutting edge 19 is subjected to thinning to form a thinning blade 19A. The thinning blade 19A is formed at a ridge line portion where the thinning surface 16D and the first flank portion 15A intersect with each other so as to move toward the axis line O1 on the inner circumferential side of the cutting edge 19.

A pair of coolant holes 110 are provided at the drill main body 11 by being drilled symmetrically with respect to the axis line O1. The coolant holes 110 move to the tip side from the base end surface of the shank portion 12, while being twisted around the axis line O1, with an equal lead kept with respect to the twist of the chip discharging grooves 14. These coolant holes 110 extend parallel to the chip discharging grooves 14 inside the land portion 17 at the cutting edge portion 13. Here, the coolant holes 110 may extend helically. The pair of coolant holes 110 are both opened at the second flank portion 15B of the tip flank 15.

The coolant hole 110 is constant in shape and dimension on the cross section orthogonal to the axis line O1 over the entire length of the drill main body 11. The coolant hole 110 is formed with a wall surface which includes a front hole wall surface 110A, a rear hole wall surface 110B and an outer-circumference hole wall surface 110C. On the cross section orthogonal to the axis line O1, the front hole wall surface 110A is positioned forward in the drill rotating direction T1 and substantially constant in interval A1 with the front groove wall surface 16A of the chip discharging groove 14. Further, the rear hole wall surface 110B is positioned backward in the drill rotating direction T1 and substantially constant in interval B1 with the rear groove wall surface 16B of the chip discharging groove 14. Still further, the outer-circumference hole wall surface 110C is positioned on the outer circumferential side in the drill main body 11 and substantially constant in interval C1 with the outer circumference flank 18C of the outer-circumference wall surface 18 at the land portion 17.

An interval between the front hole wall surface 110A and the rear hole wall surface 110B in the circumferential direction (the drill rotating direction T1 of the drill main body 11) is gradually increased toward the outer circumferential side of the drill main body 11. A percentage for increasing the interval (an increasing rate of the interval) is gradually increased toward the outer circumferential side.

In the coolant-hole equipped drill of the present embodiment, as described above, the groove wall surface 16 of the chip discharging groove 14 is formed so that the cross section thereof is formed in a recessed curve. Therefore, the cross section of the front hole wall surface 110A and that of the rear hole wall surface 110B are formed in a raised curve so as to be convex on the inner circumferential side of the coolant hole 110. Further, the cross section of the outer-circumference hole wall surface 110C is formed in a recessed curve which is concave on the outer circumferential side of the coolant hole 110. Thereby, the cross section of the coolant hole 110 is formed in a fan-like shape on the cross section orthogonal to the axis line O1.

Figure 6:
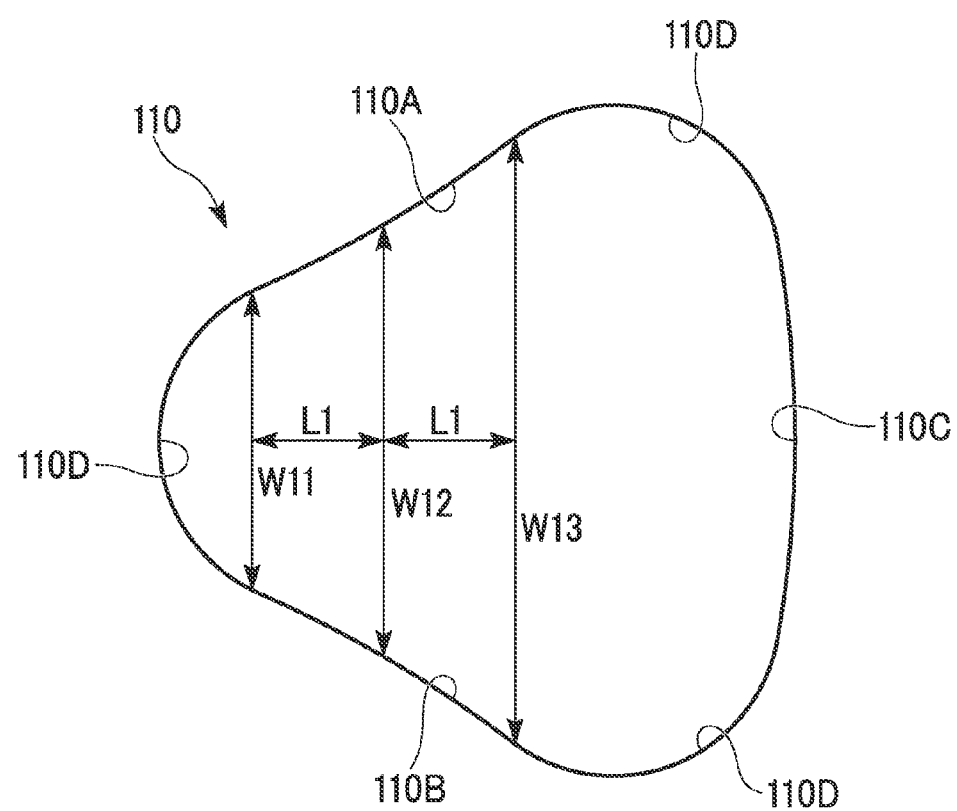
FIG. 6 is an enlarged view of a coolant hole 110 on the cross section orthogonal to the axis line O1 of the embodiment given in FIG. 1.

Thereby, as shown in FIG. 6, intervals W11, W12, W13 between the front hole wall surface 110A and the rear hole wall surface 110B in the circumferential direction are gradually increased by each unit length of L1 toward the outer circumferential side in the radial direction. That is, there is found a relationship of W11<W12<W13. An increasing percentage thereof (an increasing rate) is also gradually increased toward the outer circumferential side. That is, there is found a relationship of W12−W11<W13−W12.

Parts at which the front hole wall surface 110A, the rear hole wall surface 110B and the outer-circumference hole wall surface 110C intersect with each other (three intersecting ridge line portions) are smoothly connected by recessed curve portions 110D. Each of the recessed curve portions 110D are smaller in curvature radius than the front hole wall surface 110A, the rear hole wall surface 110B and the outer-circumference hole wall surface 110C. Further, the recessed curve portion 110D is smaller in curvature radius than the groove wall surface 16 of the chip discharging groove 14 as well as the recessed curve and the raised curve on the cross section orthogonal to the axis line O of the outer circumference flank 18C. The interval between the front hole wall surface 110A and the rear hole wall surface 110B is gradually increased toward the outer circumferential side at parts excluding the recessed curve portions 110D, and the increasing percentage thereof (the increasing rate) is also gradually increased.

Here, the interval between the front hole wall surface 110A and the front groove wall surface 16A is given as A1. Further, the interval between the rear hole wall surface 110B and the rear groove wall surface 16B is given as B1. Still further, the interval between the outer-circumference hole wall surface 110C and the outer-circumference wall surface 18 (an outer circumference flank 18C) is given as C1. When the intervals A1, B1 and C1 are compared in terms of dimensions, in the present embodiment, the interval C1 is the largest. Further, the interval A1 and the interval B1 are dimensionally equal to each other.

Further, that the intervals A1, B1, C1 are constant or substantially constant means that dimensional differences between the intervals A1, B1, C1 and the respective predetermined normal dimensions are within a range of ±10% in the respectively specified dimensions.

Still further, that the interval A1 and the interval B1 are dimensionally equal means that based on a position where the interval A1 is equal to the interval B1, the coolant hole 110 is formed in a range of ±5° with the axis line O1 as its center.

In addition, each of the intervals A1, B1 is in a range of 3% or more and 15% or less with respect to the outer diameter of the cutting edge 19 (a diameter of a circle formed by an outer circumference end of the cutting edge 19 around the axis line O1) D1. The interval C1 is in a range of 5% or more and 20% or less with respect to the outer diameter D1. The curvature radius of the recessed curve portion 110D is 15% or less with respect to the outer diameter D1.

Further, an interval E1 between the axis line O1 of the drill main body 11 and the coolant hole 110 is in a range of 5% or more and 25% or less with respect to the outer diameter D1 of the cutting edge 19. That is, the interval E1 is a radius of a circle whose center is the axis line O1 in contact with the recessed curve portion 110D. The recessed curve portion 110D is formed at a part where the front hole wall surface 110A of the coolant hole 110 intersects with the rear hole wall surface 110B thereof. In particular, in the present embodiment, the interval E1 is larger than the radius of a web thickness circle in contact with the groove wall surface 16 of the chip discharging groove 14 with the center of the axis line O1 as its center. Further, the width of the coolant hole 110 in the radial direction with respect to the axis line O1 (the width of the drill main body 11 in the radial direction, or the width of a circle whose center is the axis line O1 in the radial direction on the cross section orthogonal to the axis line O1) F1 is in a range of 10% or more and 30% or less with respect to the outer diameter D1 of the cutting edge 19. The greatest width G1 of the coolant hole 110 in the circumferential direction is also in a range of 10% or more and 30% or less with respect to the outer diameter D1 of the cutting edge 19.

On the other hand, of the hole wall surfaces 110A, 110B, 110C, the front hole wall surface 110A and the rear hole wall surface 110B extend so as to come closer to each other toward the inner circumferential side of the drill main body 11. An angle (a first angle) α1 is formed between the front hole wall surface 110A and the rear hole wall surface 110B on the cross section orthogonal to the axis line O1. The angle α of the present embodiment is an acute angle. Here, a straight line (a first straight line) which connects an intersection point of the front groove wall surface 16A of the chip discharging groove 14 and the outer-circumference wall surface 18 of the land portion 17 (an intersection point with the margin portion 18A) P1 with the axis line O1 is given as M1. Further, a straight line (a second straight line) which connects an intersection point of the rear groove wall surface 16B and the outer-circumference wall surface 18 (an intersection point of the chamfered portion 16C and the outer circumference flank 18C) Q1 with the axis line O1 is given as N1. Still further, an angle held between the straight line M1 and the straight line N1 is given as β1 (a second angle). In the present embodiment, the angle β1 is an acute angle. Here, the angle α1 is in a range of 50% or more and 80% or less with respect to the angle β1.

In the present embodiment, each of the front hole wall surface 110A and the rear hole wall surface 110B is formed in such a curved shape that the cross section thereof is convex on the inner circumferential side of the coolant hole 110, as described above. Further, the front hole wall surface 110A and the rear hole wall surface 110B are connected so as to smoothly continue to the recessed curve portion 110D formed at a part where they intersect with each other at the end closer to the axis line O1. Still further, the front hole wall surface 110A and the rear hole wall surface 110B are connected so as to smoothly continue to the recessed curve portions 110D formed at parts where they intersect with the outer-circumference hole wall surface 110C at the ends distant from the axis line O1. That is, as shown in FIG. 5, the angle α1 is an intersection angle formed by a tangent in contact with both ends of the front hole wall surface 110A and a tangent in contact with both ends of the rear hole wall surface 110B.

In the coolant-hole equipped drill of the present embodiment, as described above, the intervals W11, W12, W13 between the front hole wall surface 110A and the rear hole wall surface 110B of the coolant hole 110 in circumferential direction are gradually increased by each unit length of L1 toward the outer circumferential side so as to give a relationship of W11<W12<W13. A percentage (an increasing rate) for increasing the interval is also gradually increased toward the outer circumferential side so as to give a relationship of W12−W11<W13−W12. Therefore, as compared with a case where the intervals between the front hole wall surface 110A and the rear hole wall surface 110B are increased at a constant percentage toward the outer circumferential side to give a relationship of W12−W11=W13−W12, an interval on the outer circumferential side is increased. Accordingly, coolant is supplied in a greater amount at the outer circumferential side of the coolant hole 110.

The drill main body 11 rotates around the axis line O1 at high speeds in boring work, by which centrifugal force acts on coolant supplied through the coolant hole 110 toward the outer circumferential side. Therefore, the coolant which is supplied in an accordingly greater amount on the outer circumferential side can be accelerated by the centrifugal force and ejected at higher speeds from the opening portion of the tip flank 15. In particular, a site of the cutting edge on the outer circumferential side is large in rotating diameter from the axis line O1. Thus, a chip production amount, cutting loads and heat generation during cutting are increased in the vicinity thereof. According to the present embodiment, it is possible to efficiently supply a greater amount of the coolant to the outer circumferential site of the cutting edge and a site of a hole-to-be-bored on the outer circumferential side on a workpiece cut by the outer circumferential site of the cutting edge. As a result, the above-described coolant-hole equipped drill is able to effectively cool and lubricate a difficult cutting material which is low in heat conductivity such as stainless steel and also perform stable and efficient boring work by smoothly discharging chips.

Further, in the present embodiment, the intervals between the front hole wall surface 110A of the coolant hole 110 and the rear hole wall surface 110B thereof in the circumferential direction are gradually increased toward the outer circumferential side. Also, a percentage for increasing the intervals (an increasing rate) is gradually increased toward the outer circumferential side. More specifically, the front hole wall surface 110A and the rear hole wall surface 110B are formed in such a manner that both the cross sections are formed in a curved shape which is convex inside the coolant hole 110 on the cross section orthogonal to the axis line O1. Thereby, it is possible to broadly supply coolant to the outer circumferential side of the drill main body 11 forward in the drill rotating direction T1 and backward in the drill rotating direction T1.

That is, in order that the intervals between the front hole wall surface 110A of the coolant hole 110 and the rear hole wall surface 110B thereof are gradually increased toward the outer circumferential side and a percentage for increasing the intervals (an increasing rate) is also gradually increased toward the outer circumferential side, the following procedures will be conducted. On the cross section orthogonal to the axis line O1 of the drill main body 11, at least one of the front hole wall surface 110A and the rear hole wall surface 110B is formed in such a curved shape that the cross section thereof is convex inside the coolant hole 110. The other of the front hole wall surface 110A and the rear hole wall surface 110B may be formed so that the cross section thereof is in a straight line on the cross section orthogonal to the axis line O1. Further, each of the front hole wall surface 110A and the rear hole wall surface 110B may be formed in such a curved shape that the cross section thereof is concave outside the coolant hole 110 as long as the percentage for increasing the intervals (the increasing rate) is gradually increased toward the outer circumferential side.

However, in these cases, coolant will be easily supplied in a lopsided manner to one of the front hole wall surface 110A and the rear hole wall surface 110B, the cross section of which is formed in a raised curved-shape so as to be convex inside the coolant hole 110. On the other hand, in the present embodiment, as described above, each of the front hole wall surface 110A and the rear hole wall surface 110B is formed in such a curved shape that the cross section thereof is convex inside the coolant hole 110. Thereby, it is possible to prevent such a lopsided supply of the coolant and supply the coolant broadly in the circumferential direction, that is, forward and backward in the drill rotating direction T1. The cross section orthogonal to the axis line O1 of the coolant hole 110 may be asymmetrical in the circumferential direction, as described above. However, in order to attain the above effects more reliably, it is preferable that the cross section is symmetrical with respect to the center line in the circumferential direction.

Further, in the present embodiment, the outer-circumference hole wall surface 110C of the coolant hole 110 is formed in a curved shape in such a manner that the cross section thereof is concave outside the coolant hole 110 on the cross section orthogonal to the axis line O1. However, the outer-circumference hole wall surface 110C may not be formed in the above-described shape, unless it protrudes up to a gap part between the front hole wall surface 110A and the rear hole wall surface 110B to narrow the interval. The outer-circumference hole wall surface 110C may be formed, for example, in a raised curve in such a manner that the cross section thereof is convex inside the coolant hole 110, as with the front hole wall surface 110A and the rear hole wall surface 110B, or may be formed in a straight line. However, the cross section is formed in a recessed curve, as described above, by which it is possible to decrease an interval between the outer-circumference hole wall surface 110C and a cut site on an outer circumferential side of hole bottom of a hole-to-be-bored on a workpiece and an interval between the outer-circumference hole wall surface 110C and an inner wall surface of the hole-to-be-bored at the opening portion of the coolant hole 110 at the tip flank 15. Therefore, according to the present embodiment, it is possible to evenly and broadly supply the coolant which has been efficiently supplied to the outer circumferential side of the coolant hole 110 to the cut site on the outer circumferential side of the hole-to-be-bored on the workpiece.

As described above, the percentage at which the intervals W11, W12, W13 between the front hole wall surface 110A and the rear hole wall surface 110B are increased by each unit length of L1 toward the outer circumferential side is expressed by a relationship of (W13−W12)/(W12−W11). Where the percentage is excessively small and, for example, the percentage is close to 1 (100%), there is found a case of W13−W12≈W12−W11. In this case, as described above, there is a possibility that coolant may not be supplied in a sufficiently increased amount at the outer circumferential side. On the other hand, where the percentage is excessively large, the coolant is supplied in an increased amount but the coolant hole 110 is made longer in entire circumference length on the cross section (the circumference length of the entire hole wall surface). Thereby, there is a case where pressure loss may be increased. In this case, there is a possibility that the coolant may be ejected at a decreased pressure through the opening portion of the coolant hole 110 at the tip flank 15 to result in a decrease in efficiency of supplying the coolant. Thus, the percentage for increasing the intervals between the front hole wall surface 110A and the rear hole wall surface 110B (an increasing rate) is preferably in the following range as will be demonstrated by an example to be described later. That is, where the unit length of L1 to the outer circumferential side is given as 1 mm in the radial direction with respect to the axis line O1, the percentage for increasing the intervals (the increasing rate) is preferably in a range of 1.3 times or more and 1.9 times or less with respect to each unit length of L1, that is, in a range of 130% or more and 190% or less.

Further, in the coolant-hole equipped drill of the present embodiment, the coolant hole 110 includes the front hole wall surface 110A, the rear hole wall surface 110B and the outer-circumference hole wall surface 110C. Here, the front hole wall surface 110A keeps the constant interval A1 with respect to the front groove wall surface 16A of the chip discharging groove 14 which forms the land portion 17. The rear hole wall surface 110B keeps the constant interval B1 with respect to the rear groove wall surface 16B. The outer-circumference hole wall surface 110C keeps the constant interval C1 with respect to the outer circumference flank 18C of the outer-circumference wall surface 18. The wall portions of the drill main body 11 remaining between these hole wall surfaces 110A, 110B, 110C and the groove wall surfaces 16A, 16B and the outer-circumferential wall surface 18 are respectively equal and constant in thickness to the intervals A1, B1, C1. Therefore, it is possible to prevent the formation of thin parts at these wall portions and secure the strength of the cutting edge portion 13 of the drill main body 11. It is, then, possible to prevent breakage of the drill main body 11 during boring work.

The hole wall surfaces 110A, 110B, 110C can be formed, as described above, with a certain width kept, so as to extend respectively along the groove wall surfaces 16A, 16B and the outer-circumference wall surface 18, while securing the strength of the wall portion. Thereby, the coolant hole 110 can be increased in cross sectional area to supply coolant in an increased amount. Further, as described above, the interval between the front hole wall surface 110A and the rear hole wall surface 110B is increased toward the outer circumferential side and the increasing percentage thereof (the increasing rate) is also increased, by which the coolant can be supplied in a further increased amount. Then, the coolant is supplied in a greater amount by the synergistic effect, by which the drill main body 11 is greatly improved in lubricating and cooling capacities. Thus, even if the drill main body 11 is fed greatly during boring work, it is possible to reliably and effectively lubricate and cool the cutting edge 19 and a cut site of a workpiece (the bottom surface of a hole-to-be-bored). It is also possible to smoothly discharge produced chips through the chip discharging groove 14.

Further, since the intervals A1, B1, C1 are respectively constant, an interval between the front hole wall surface 110A and the cutting edge 19 is also substantially constant along the cutting edge 19 at the opening portion of the coolant hole 110 on the tip flank 15. Thereby, it is possible to supply coolant evenly and efficiently over the entire length not only on the outer circumferential side of the cutting edge 19 but also on the inner circumferential side thereof. It is, therefore, possible to prevent a lopsided lubrication and cooling effect on the cutting edge 19 and a cut site. Thus, when a difficult cutting material which is low in heat conductivity such as stainless steel is bored, it is possible to prevent the cutting edge 19 from occurrence of partial adhesion and conduct stable boring work. It is also possible to obtain similar effects on mist processing in which a cutting temperature is raised.

This is also true for an interval between the rear hole wall surface 110B of the opening portion of the coolant hole 110 on the tip flank 15 and the rear groove wall surface 16B of the chip discharging groove 14 and an interval between the outer-circumference hole wall surface 110C and the outer circumference flank 18C. For example, if the interval between the outer-circumference hole wall surface 110C and the outer circumference flank 18C is constant, coolant can be supplied evenly between the outer circumference flank 18C and an inner circumferential surface of a hole-to-be-bored. Thereby, it is possible to efficiently cool the inner circumferential surface of the hole-to-be-bored at which frictional heat is generated by abrasion of the margin portion 18A. It is also possible to efficiently lubricate the margin portion 18A and the inner circumferential surface of the hole-to-be-bored.

Further, since the interval between the rear hole wall surface 110B of the coolant hole 110 and the rear groove wall surface 16B of the chip discharging groove 14 is constant, the flow of coolant which flows from the rear groove wall surface 16B side into the chip discharging groove 14 to push out chips is also substantially constant inside the chip discharging groove 14. Thereby, it is possible to quickly discharge chips produced by the cutting edge 19 without retention of the chips.

In particular, in the present embodiment, the cross section of the coolant hole 110 is formed in a fan-like shape as described above, and the opening portion of the tip flank 15 at which the coolant hole 110 is opened is also formed substantially in a similar shape. Excluding the recessed curve portion 110D, the front hole wall surface 110A and the rear hole wall surface 110B intersect with the tip flank 15, by which open edges are formed forward and backward in the drill rotating direction. The open edges are formed in a raised curve so as to be convex on the inner circumferential side of the coolant hole 110 and gradually increased in mutual intervals in the circumferential direction toward the outer circumferential side. Further, the open edges are formed in such a manner that a percentage for increasing their intervals (an increasing rate) is gradually increased to the outer circumferential side. Still further, the outer-circumference hole wall surface 110C intersects with the tip flank 15 to form an open edge on the outer circumferential side. The open edge on the outer circumferential side is formed in a recessed curve in which an interval with the outer circumference flank 18C is constant and which is concave on the outer circumferential side of the coolant hole 110. In other words, the open edge on the outer circumferential side is formed in a recessed curve positioned on a cylindrical surface whose center is the axis line O1.

Therefore, the interval at the opening portion of the coolant hole 110 in the circumferential direction is accordingly increased, with the percentage for increasing the interval being increased, toward the outer circumferential side where the centrifugal force acts by the rotation of the drill main body 11. Thereby, as described above, the coolant which has been supplied in an increased amount can be accelerated and ejected at high speeds from the opening portion, by which the coolant can be broadly supplied to the cutting edge 19, a cut site, and so on. Further, the interval at the opening portion of the coolant hole 110 in the circumferential direction becomes substantially the largest at an open edge formed by the outer-circumference hole wall surface 110C on the outer most circumference which intersects with the tip flank 15. As described above, the coolant which has been ejected at higher speeds can be dispersed more broadly. Therefore, it is possible to prevent the lopsided lubrication and cooling effect more reliably.

Further, a comparison is made among the interval C1 between the outer-circumference hole wall surface 110C of the coolant hole 110 and the outer-circumference wall surface 18 (the outer circumference flank 18C), the interval A1 between the front hole wall surface 110A and the front groove wall surface 16A and the interval B1 between the rear hole wall surface 110B and the rear groove wall surface 16B. In the present embodiment, the interval C1 is larger than the interval A1 and the interval B1. Thereby, the drill main body 11 remaining at parts of the intervals A1, B1, C1 is largely ensured in thickness on the outer circumferential side. Therefore, even if the coolant hole 110 is increased in cross sectional area to supply coolant in an increased amount, it is possible to more effectively maintain or improve the strength of the drill main body 11 at the cutting edge portion 13.

However, where the interval C1 is excessively small, the thickness is also reduced to result in a failure in securing the strength of the drill main body 11. In contrast, where the interval C1 is excessively large, the coolant hole 110 is decreased in cross sectional area. Therefore, there is a possibility that the coolant may not be supplied in an increased amount. Thus, the interval C1 is preferably in a range of 5% or more and 20% or less with respect to the outer diameter D1 of the cutting edge 19, as described in the present embodiment.

On the other hand, in the present embodiment, the interval A1 between the front hole wall surface 110A and the front groove wall surface 16A and the interval B1 between the rear hole wall surface 110B and the rear groove wall surface 16B, both of which are smaller than the interval C1, are dimensionally equal to each other. Then, as described above, both ends of a wall portion in the circumferential direction which is a part of the interval C1 where the thickness is sufficiently secured are in a state of being supported by wall portions which are parts of the intervals A1, B1 mutually equal in dimensions. It is, thereby, possible to keep the strength of the drill main body 11 equal at the land portion 17 forward and backward in the drill rotating direction T1. Therefore, for example, as compared with a case where any one of the wall portions is made thin, it is possible to more reliably prevent the occurrence of breakage, and so on.

Since the interval A1 is equal to the interval B1, it is also possible to make equal an interval between the front hole wall surface 110A and the cutting edge 19 on the tip flank 15 and an interval between the rear hole wall surface 110B and the rear groove wall surface 16B. Therefore, coolant can be dispersed more evenly to the cutting edge 19 side and the heel side.

Where the intervals A1, B1 dimensionally equal to each other are excessively small, wall portions remaining at parts of the intervals A1, B1 are also decreased in thickness. Then, there is the possibility of not being able to secure a sufficient strength of the drill main body 11.

In contrast, where the intervals A1, B1 are excessively large, the coolant hole 110 is decreased in cross sectional area. Then, there is the possibility of not being able to supply coolant in an increased amount. Therefore, the intervals A1, B1 are preferably in a range of 3% or more and 15% or less with respect to the outer diameter D1 of the cutting edge 19, as described in the present embodiment.

Further, in the present embodiment, the interval E1 between the axis line O1 of the drill main body 11 and the coolant hole 110 is in a range of 5% or more and 25% or less with respect to the outer diameter D1 of the cutting edge 19. That is, an interval between the axis line O1 on the cross section orthogonal to the axis line O1 and the recessed curve portion 110D formed between the front hole wall surface 110A of the coolant hole 110 and the rear hole wall surface 110B thereof is in the above range.

Therefore, no coolant hole 110 is formed at a web part in a periphery of the axis line O1 of the drill main body 11. Thus, sufficient thickness can be secured at the web part, thereby making it possible to more reliably maintain the strength of the drill main body 11 and the rigidity against twist. However, where the interval E1 is larger than the above range, the coolant hole 110 is formed on the outer circumferential side from a position significantly distant from the axis line O1. In this case, if the intervals A1, B1 are managed to be constant with respect to the coolant hole 110, the coolant hole 110 is inevitably decreased in cross sectional area.

On the other hand, in the present embodiment, the coolant hole 110 is regulated for the dimensions by the following, that the width F1 of the coolant hole 110 in the radial direction with respect to the axis line O1 is in a range of 10% or more and 30% or less with respect to the outer diameter D1 of the cutting edge 19, that the width G1 in the circumferential direction is also in a range of 10% or more and 30% or less with respect to the outer diameter D1, that the angle $\alpha 1$ formed by the front hole wall surface 110A and the rear hole wall surface 110B is in a range of 50% or more and 80% or less with respect to the angle $\beta 1$ formed by the straight line M1 and the straight line N1. Here, the straight line M1 is a straight line which connects an intersection point (an intersection point with the margin portion 18A) P1 of the front groove wall surface 16A of the chip discharging groove 14 and the outer-circumference wall surface 18 of the land portion 17 with the axis line O1. The straight line N1 is a straight line which connects an intersection point (an intersection point of the chamfered portion 16C and the outer circumference flank 18C) Q1 of the rear groove wall surface 16B and the outer-circumference wall surface 18 with the axis line O1. The coolant hole 110 is regulated for the dimensions as described above, by which the coolant hole 110 is secured for a sufficient cross sectional area to prevent the reduction in strength of the drill main body 11.

That is, where the width F1, the width G1 and the angle α1 are excessively larger than the above-described respective ranges, the coolant hole 110 is made excessively large. Then, even if the intervals A1, B1, C1 are constant, it is not able to keep the strength of the drill main body 11. In contrast, where the width F1, the width G1 and the angle α1 are smaller than the previously described ranges, the coolant hole 110 cannot be made greater in cross sectional area with respect to the outer diameter D1 of the cutting edge 19. Therefore, there is the possibility that sufficient lubrication or cooling effect may not be obtained. Further, in particular where the angle α1 is greater than or less than the previously described range, there is the possibility that the intervals A1, B1 may not be made constant. Thus, it is preferable that the width F1, the width G1 and the angle α1 are also kept in the range described in the present embodiment.

Next, a description will be given of another embodiment of the coolant-hole equipped drill in the present invention.

A coolant-hole equipped drill of the present embodiment is shown in FIG. 7 to FIG. 12. The coolant-hole equipped drill of the present embodiment is similarly configured as the coolant-hole equipped drill of the previously described embodiment.

That is, the coolant-hole equipped drill of the previously described embodiment is provided with the drill main body 11, the shank portion 12, the cutting edge portion 13, the chip discharging groove 14, the tip flank 15, the groove wall surface 16, the land portion 17, the outer-circumference wall surface 18, the cutting edge 19 and the coolant hole 110. Similarly, the coolant-hole equipped drill of the present embodiment is provided with a drill main body 21, a shank portion 22, a cutting edge portion 23, a chip discharging groove 24, a tip surface 25, a groove wall surface 26, a land portion 27, an outer-circumference wall surface 28, a cutting edge 29 and a coolant hole 210.

Hereinafter, a description will be given mainly of differences between the coolant-hole equipped drill of the previously described embodiment and the coolant-hole equipped drill of the present embodiment. The coolant-hole equipped drill of the present embodiment is similar to that of the previously described embodiment except the differences to be described hereinafter.

The outer-circumference wall surface 28 of the land portion 27 includes a first margin portion 28A, a second margin portion 28B and a third margin portion 28C.

The first margin portion 28A is positioned forward in a drill rotating direction T2, with the outer circumferential surface extending on a cylindrical surface whose center is an axis line O2. Further, the first margin portion 28A intersects with the front groove wall surface 26A to form a leading edge.

The second margin portion 28B is provided behind the first margin portion 28A in the drill rotating direction T2, with an interval kept. The outer circumferential surface of the second margin portion 28B extends on the same cylindrical surface of the first margin portion 28A.

The third margin portion 28C is provided further behind the second margin portion 28B in the drill rotating direction T2, with an interval kept. The outer circumferential surface of the third margin portion 28C extends on the same cylindrical surface as the first and the second margin portions 28A, 28B.

Here, the first, the second and the third margin portions 28A, 28B, 28C are compared to each other in width in the circumferential direction. Of these margin portions, the third margin portion 28C is the greatest in width in the circumferential direction. Next, the first margin portion 28A is greater in width in the circumferential direction. The second margin portion 28B is the smallest in width in the circumferential direction.

Further, a first body clearance 28D is formed at a part between the first margin portion 28A and the second margin portion 28B. A second body clearance 28E is formed at a part between the second margin portion 28B and the third margin portion 28C. The first and the second body clearances 28D, 28E extend on a cylindrical surface slightly smaller in diameter than the cylindrical surface on which the outer circumferential surfaces of the first, the second and the third margin portions 28A, 28B, 28C extend.

The parts from the outer circumferential surfaces of the first, the second and the third margin portions 28A, 28B, 28C to the first and the second body clearances 28D, 28E are formed in the shape of a recessed curved-surface smoothly in contact with the first and the second body clearances 28D, 28E.

On the other hand, two flank portions, that is, a first flank portion 25A and a second flank portion 25B, are formed on the tip surface 25 of the cutting edge portion 23. In the present embodiment, the first and the second flank portions 25A, 25B are increased in relief angle in a step-wise manner backward in the drill rotating direction T2. The first and the second flank portions 25A, 25B are formed forward in the drill rotating direction T2.

The cutting edge 29 is formed at a ridge line portion (an intersecting ridge line portion) between the first flank portion 25A forward in the drill rotating direction T2 and a tip side part of the front groove wall surface 26A of the chip discharging groove 24. Further, a thinning blade 29A which is subjected to thinning and moves to the axis line O2 toward the inner circumferential side is formed at the inner circumferential portion of the cutting edge 29.

A first thinning surface 26D is formed by the thinning at an inner circumferential portion at the tip side part of the front groove wall surface 26A, and a second thinning surface 25C is formed on the tip surface 25.

The thinning blade 29A is formed at a ridge line portion between the first thinning surface 26D and the first flank portion 25A.

The second thinning surface 25C is formed at the second flank portion 25B backward in the drill rotating direction T2. The second thinning surface 25C intersects with the first thinning surface 26D so as to form a recessed V-letter shape. The second thinning surface 25C is inclined to the second flank portion 25B so as to move backward to the base end side in the direction of the axis line O2 at an inclination angle larger than the relief angle of the second flank portion 25B backward in the drill rotating direction T2.

Figure 7:
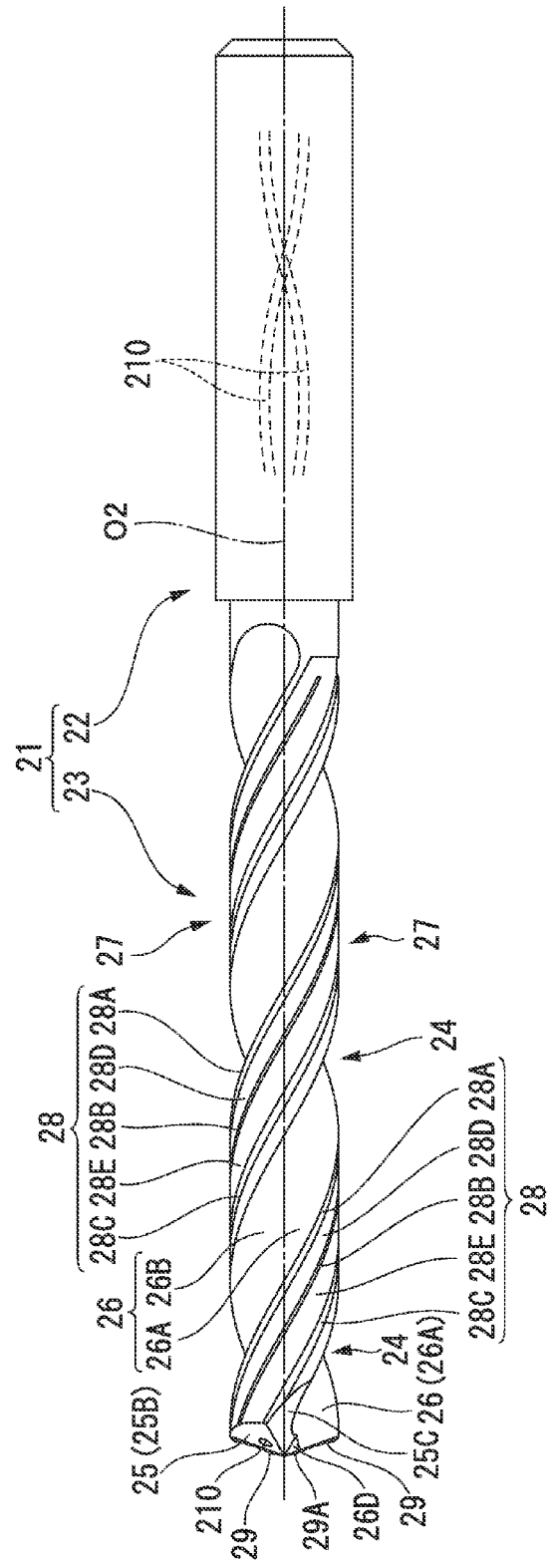
FIG. 7 is a side view which shows one embodiment of the present invention.
Figure 8:
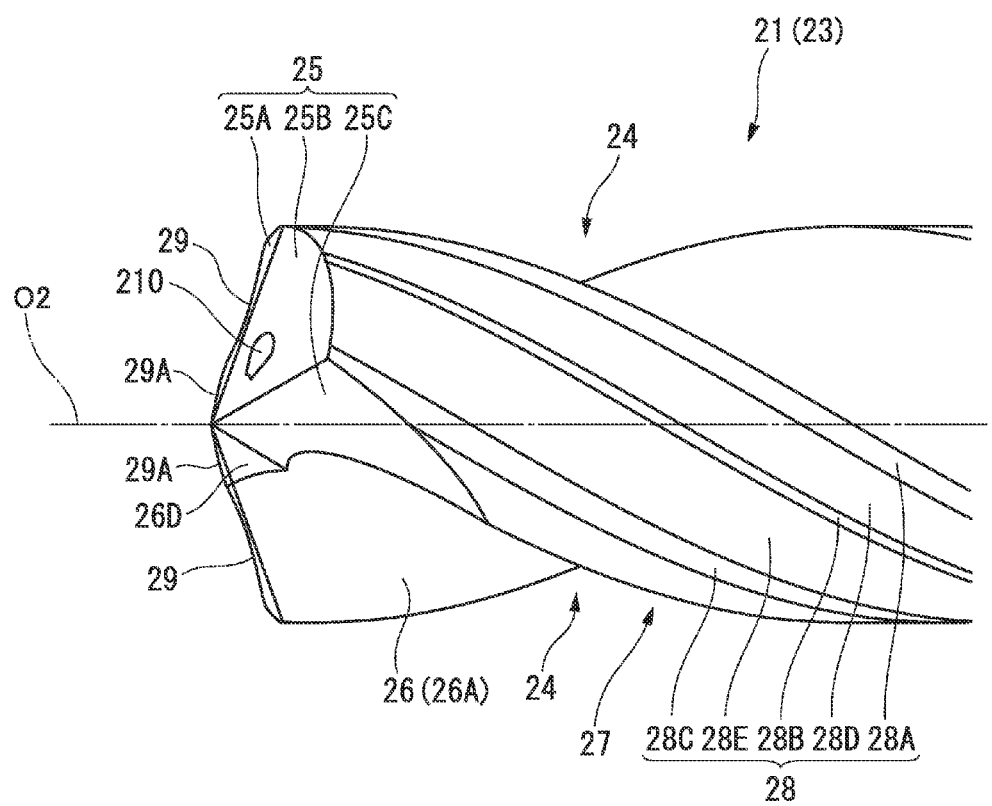
FIG. 8 is an enlarged side view which shows a tip side of a cutting edge portion 23 of the embodiment given in FIG. 7.

As shown by the broken line in FIG. 7, the drill main body 21 is provided with a pair of coolant holes 210 which are drilled so as to be symmetrical with respect to the axis line O2. Each of the coolant holes 210 moves from the base end surface of the shank portion 22 to the tip side thereof, while being twisted around the axis line O2, with an equal lead kept with respect to the chip discharging groove 24. These coolant holes 210 extend helically inside the land portion 27 at the cutting edge portion 23 parallel to the chip discharging groove 24. The pair of coolant holes 210 are respectively opened at the second flank portion 25B on the tip surface 25.

Figure 9:
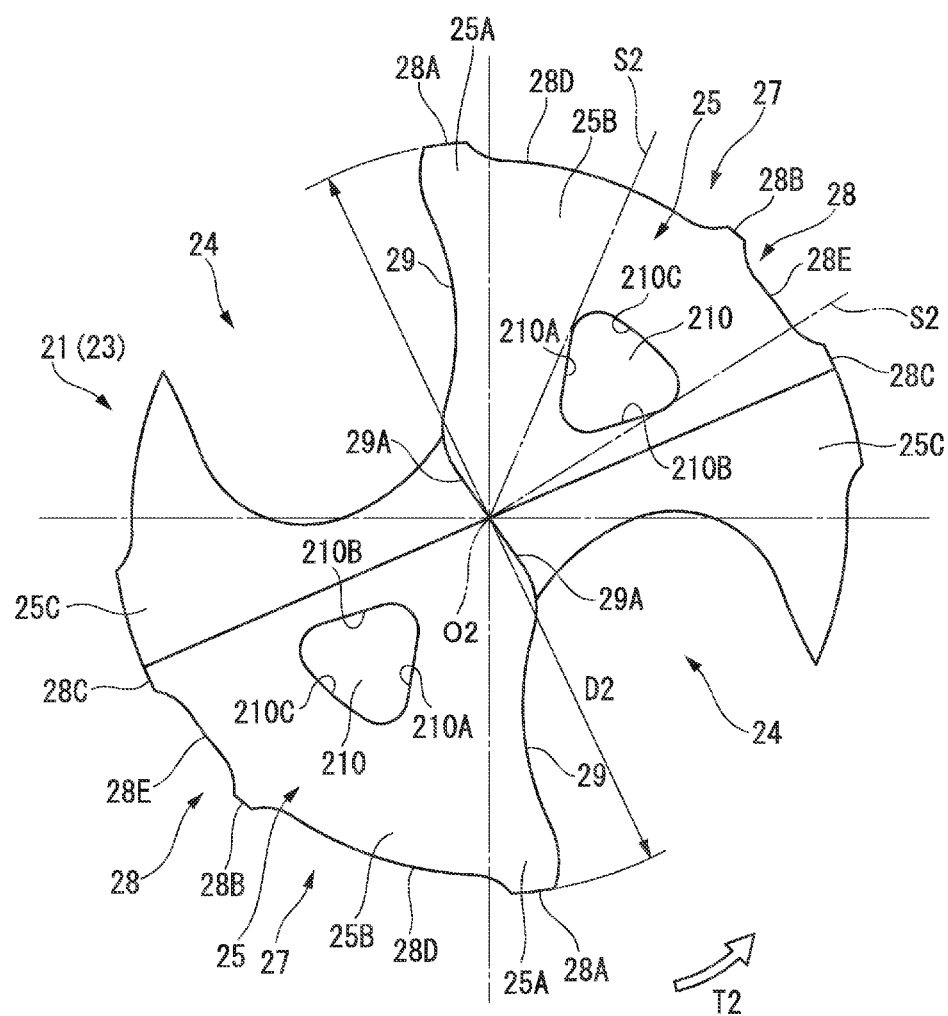
FIG. 9 is an enlarged front elevational view of the embodiment given in FIG. 7 when viewed from the tip side in the direction of an axis line O2.
Figure 10:
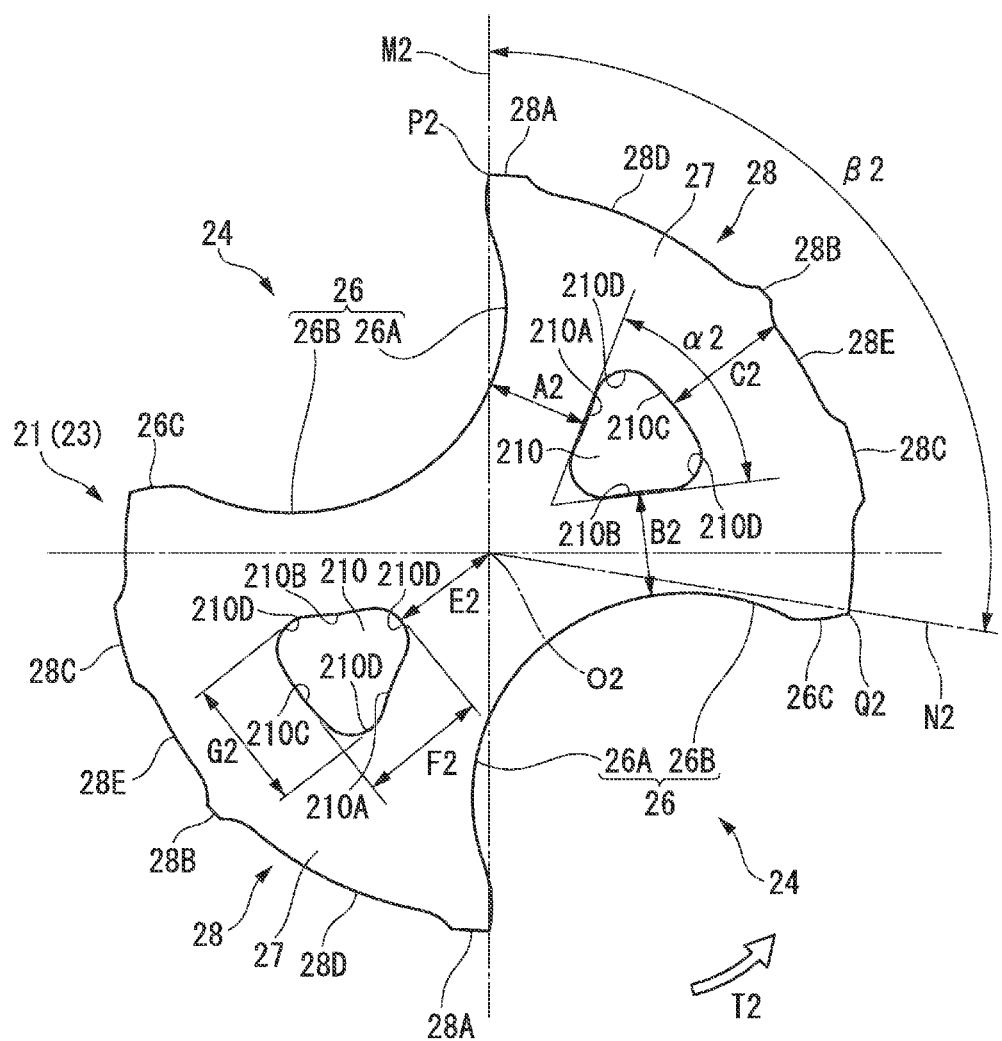
FIG. 10 is a cross sectional view of the embodiment given in FIG. 7 which is orthogonal to the axis line O2.

The second margin portion 28B intersects with the second flank portion 25B at the tip surface 25 of the cutting edge portion 23. Here, the tool main body 21 is viewed from the tip side thereof in the direction of the axis line O2. At this time, as shown in FIG. 9, two straight lines which pass through the axis line O2 and hold the opening portion of the coolant hole 210 in the circumferential direction are respectively given as S2. The opening portion of the coolant hole 210 is circumscribed by these straight lines S2. At this time, the second margin portion 28B intersects with the second flank portion 25B between the two straight lines S2. In the present embodiment, the second margin portion 28B is positioned substantially at the center of the two straight lines S2 in the circumferential direction.

On the other hand, regarding the third margin portion 28C which is the greatest in width in the circumferential direction, at least a part forward in the drill rotating direction T2 intersects with the second flank portion 25B. Then, a first ridge line portion is formed between the third margin portion 28C and the second flank portion 25B.

Further, regarding the third margin portion 28C, a part backward in the drill rotating direction T2 intersects with the second thinning surface 25C. Then, a second ridge line portion is formed between the third margin portion 28C and the second thinning surface 25C.

That is, in the present embodiment, as shown in FIG. 9, the tip of the third margin portion 28C intersects with the tip surface 25 astride the first ridge line portion with the second flank portion 25B and the second ridge line portion with the second thinning surface 25C.

Still further, regarding the third margin portion 28C, the second ridge line portion is greater in width than the first ridge line portion. In other words, regarding the third margin portion 28C, of the width in the circumferential direction, the part intersecting with the second thinning surface 25C is greater in width than the part intersecting with the second flank portion 25B. Thus, the third margin portion 28C on the heel side which intersects with the tip surface 25 is positioned backward approximately at 90° around the axis line O2 in the drill rotating direction T2 with respect to the first margin portion 28A of the cutting edge 29 side.

As described so far, each of the first, the second and the third margin portions 28A, 28B, 28C formed on the outer-circumference wall surface 28 of the land portion 27 intersects with the tip flanks (the first and the second flank portions 25A, 25B) of the cutting edge 29. Further, the tips of the first, the second and the third margin portions 28A, 28B, 28C are positioned in a range closer to the base end side in the direction of the axis line O2 from the cutting edge 29.

Therefore, it is possible to shorten the distance from a site at which the cutting edge 29 contacts a workpiece to a site at which the first, the second and the third margin portions 28A, 28B, 28C are all in slide contact with the inner circumferential surface of a hole-to-be-bored. Thus, the cutting edge portion 23 can be quickly guided by the first, the second and the third margin portions 28A, 28B, 28C. As a result, it is possible to prevent vibration of the cutting edge portion 23 at contacting.

In the present embodiment, the third margin portion 28C on the heel side which is backward in the drill rotating direction T2 intersects with the tip flank (the second flank portion 25B). Thereby, as described above, the cutting edge 29 is subjected to thinning. Then, a thinning surface (a second thinning surface 25C) is formed by the thinning behind the tip flank on the tip surface 25 of the cutting edge portion 23 in the drill rotating direction T2. The second thinning surface 25C is formed so as to move backward to the base end side of the drill main body 21 in the direction of the axis line O2. Even in such a case, it is possible to reliably supply coolant which has been ejected through the coolant hole 210 opened at the second flank portion 25B to the outer-circumference wall surface 28 of the land portion 27.

That is, the second thinning surface 25C is inclined to the second flank portion 25B so as to move backward to the base end side of the drill main body 21. Before most of the coolant flows from the thus inclined second thinning surface 25C into the chip discharging groove 24, the coolant flows in a greater amount on the second flank portion 25B which is gentler in inclination (a relief angle) than the second thinning surface 25C. Then, the coolant is supplied to the first and the second body clearances 28D, 28E on the outer-circumference wall surface 28. The coolant which has been supplied to the first and the second body clearances 28D, 28E flows through a space with the inner circumferential surface of a hole-to-be-bored which is to be formed.

Thereby, it is possible to effectively cool and lubricate the first, the second, and the third margin portions 28A, 28B, 28C as well as the inner circumferential surface of the hole-to-be-bored and prevent wear of the first, the second and the third margin portions 28A, 28B, 28C. It is, therefore, possible to secure the stable guidance property over a longer period of time and also improve the accuracy of boring work by preventing a change in enlargement allowance of the hole-to-be-bored.

Further, in the thus configured coolant-hole equipped drill, the second margin portion 28B between the first margin portion 28A and the third margin portion 28C is positioned between the two straight lines S2 which pass through the axis line O2 and circumscribe the opening portion of the coolant hole 210 so as to hold the opening portion in the circumferential direction when viewed from the tip side thereof in the direction of the axis line O2.

For this reason, coolant which has been ejected from the opening portion of the coolant hole 210 is divided substantially evenly by the second margin portion 28B and supplied respectively to the first and the second body clearances 28D, 28E.

Therefore, it is possible to prevent the coolant from being supplied in a lopsided manner to one of the body clearances 28D, 28E. It is, thereby, possible to prevent insufficient cooling and lubrication either on the body clearance 28D or the body clearance 28E. Thus, it is possible to more reliably prevent the wear of the first, the second and the third margin portions 28A, 28B, 28C.

Still further, in the present embodiment, of the first, the second and the third margin portions 28A, 28B, 28C, the third margin portion 28C is the greatest in width in the circumferential direction. In order to balance the guidance property by the first, the second and the third margin portions 28A, 28B, 28C, as described above, there is a case where the third margin portion 28C is positioned approximately at 90° around the axis line O2 with respect to the first margin portion 28A backward in the drill rotating direction T2. In this case as well, the tip of the third margin portion 28C is reliably allowed to intersect with the tip flank (the second flank portion 25B), thus making it possible to prevent the wear of the first, the second and the third margin portions 28A, 28B, 28C.

On the other hand, in the present embodiment, of the first, the second and the third margin portions 28A, 28B, 28C, the second margin portion 28B is the smallest in width in the circumferential direction. As described above, the second margin portion 28B controls coolant which has flowed on the tip flank (the second flank portion 25B) so as to supply the coolant substantially evenly to the first and the second body clearances 28D, 28E respectively. Thus, where the second margin portion 28B is excessively great in width, there is a possibility that the above-described control of the coolant may be inhibited. However, as described in the present embodiment, the second margin portion 28B is made smaller in width, by which it is possible to supply the coolant more reliably to the first and the second body clearances 28D, 28E substantially evenly and not in a lopsided manner.

Then, a large amount of coolant which has been accelerated on the outer circumferential side (the side of the outer-circumference hole wall surface 210C) at the opening portion of the coolant hole 210 toward the outer circumferential side flows, as described above, on the second flank portion 25B and is supplied evenly to the first and the second body clearances 28D, 28E. Therefore, according to the present embodiment, it is possible to more reliably prevent the wear of the first, the second and the third margin portions 28A, 28B, 28C and improve the accuracy and stability of boring work However, in the present embodiment, the coolant hole 210 has the following surfaces: that is, the front hole wall surface 210A which is positioned forward in the drill rotating direction T2 of the drill main body 21 and constant in interval A2 with the front groove wall surface 26A of the chip discharging groove 24; the rear hole wall surface 210B which is positioned backward in the drill rotating direction T2 and constant in interval B2 with the rear groove wall surface 26B; and the outer-circumference hole wall surface 210C which is positioned on the outer circumferential side of the drill main body 21 and constant in interval C2 with the outer-circumference wall surface 28 (the first and the second body clearances 28D, 28E) excluding the margin portion 28B of the land portion 27.

Figure 11:
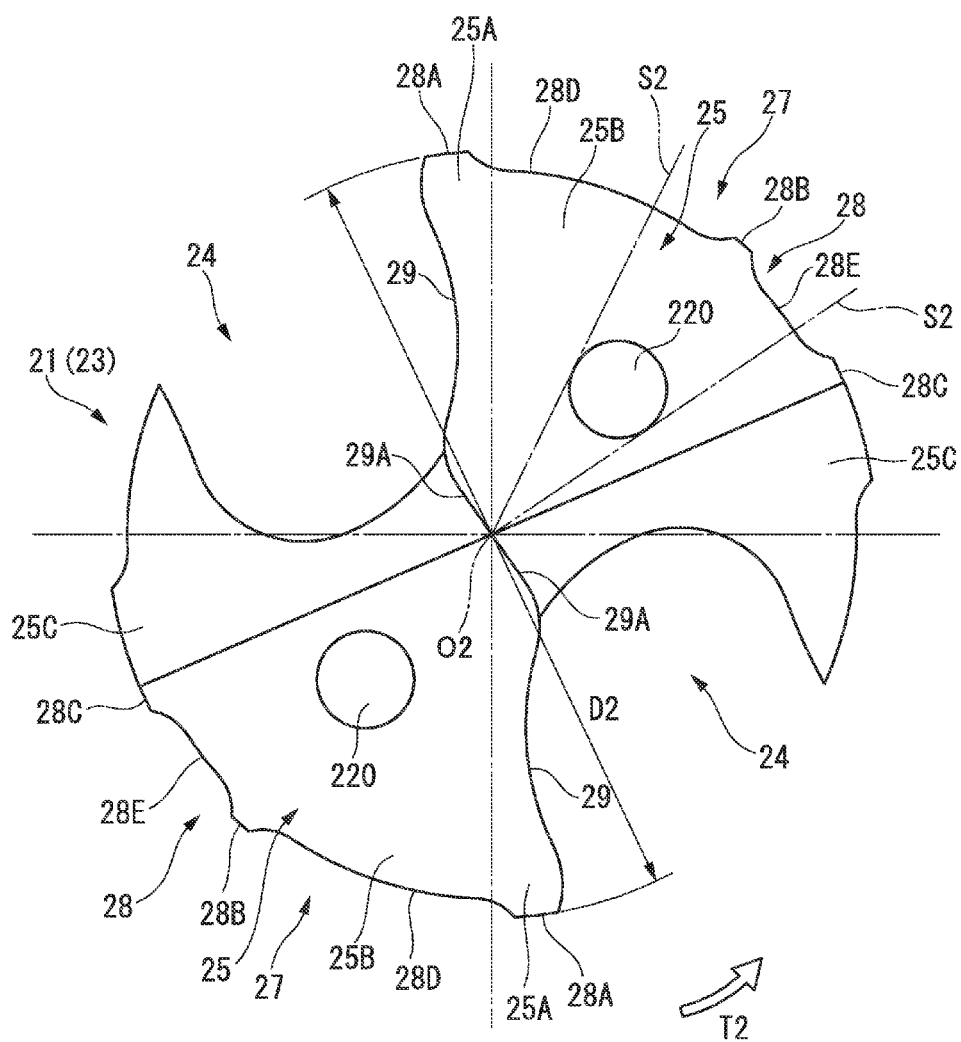
FIG. 11 is a front elevational view which shows a modified example of the embodiment given in FIG. 7.
Figure 12:
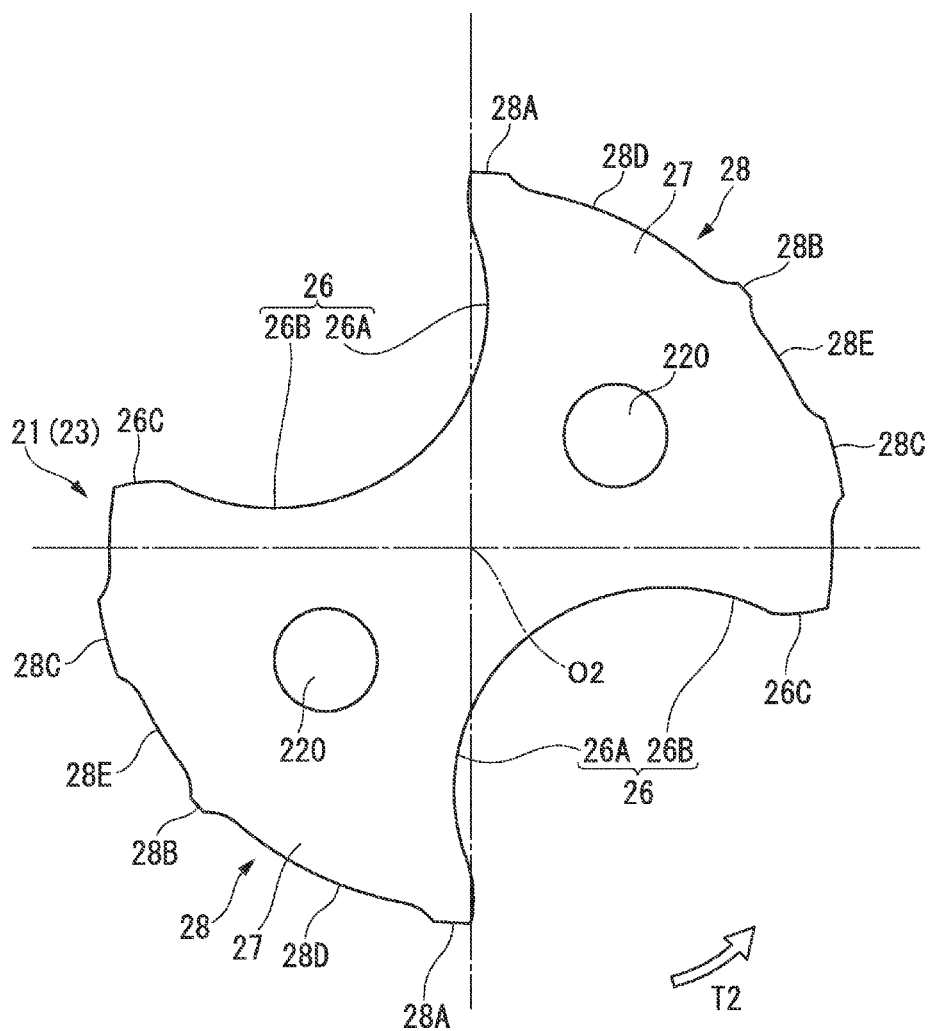
FIG. 12 is a cross sectional view of the modified example given in FIG. 11 which is orthogonal to the axis line O2.

Further, the front hole wall surface 210A of the coolant hole 210 and the rear hole wall surface 210B thereof are formed in such a manner that an interval between them in the circumferential direction is increased toward the outer circumferential side and a percentage for increasing the interval (an increasing rate) is also gradually increased toward the outer circumferential side. Then, as described above, the cross section orthogonal to the axis line O2 is formed in a fan-like shape. However, for example, as shown in FIG. 11 and FIG. 12, the present invention may also be applied to the coolant-hole equipped drill disclosed in Patent Documents 4 to 6 each of which has the coolant hole 220 whose cross section orthogonal to the axis line is circular. In the modified examples shown in FIG. 11 and FIG. 12, parts common to the previously described embodiment excluding the coolant hole 220 are given the same reference numerals, with a description omitted here.

Example 1

Hereinafter, examples will be given with reference to individual examples that the intervals A1, B1, C1, E1, the width F1, and the percentage of the angle α1 to the angle β1 in the previously described embodiment are preferably within the previously described ranges.

Here, that in which the intervals A1, B1, C1, E1, the width F1, and the percentage of the angle α1 to the angle β1 are in the ranges is given as an example (a benchmark: BM). On the other hand, those in which the values exceed the respective upper and lower limits in the previously described ranges of the embodiment are given as comparative examples. Then, the example and the comparative examples are subjected to CAE analysis. Based on the thus obtained results, the rigidity against torque is analyzed by relative evaluation when the example is 100%. Further, the flow rate of coolant which flows through the coolant hole is subjected to fluid analysis.

Here, the analysis of rigidity against torque is made under the following conditions.

The outer diameter D1 of the cutting edge 19 in the previously described embodiment is given as 6 mm. Then, used is a 46 mm-long cemented carbide cylindrical shaft which is 5.892 mm in outer diameter of the outer circumference flank 18C. A pair of chip discharging grooves 14 having a cross section common to the example and the comparative examples are formed helically on the outer circumference. Further, the coolant hole 110 is formed at the land portion 17 between the chip discharging grooves 14 respectively in the example and the comparative examples.

With first end of the cylindrical shaft being fixed, torque of 5 Nm is imparted to the second end thereof. Rigidity against torque is analyzed at a site which is 15 mm from the second end to the first end.

Further, the flow rate of coolant which flows through the coolant hole is subjected to analysis under the following conditions.

Only one coolant hole 110 with the length of 85 mm in the direction of the axis line O1 is given as a model. Then, water is used as coolant, the coolant is supplied at a pressure of 3 MPa, and the opening portion of the coolant hole 110 is kept at an atmospheric pressure, under which the flow rate is analyzed.

Further, the intervals A1, B1 of the example benchmark (BM) are both given as 10% with respect to the outer diameter D1 of the cutting edge 19. The interval C1 is given as 13% with respect to the outer diameter D1 of the cutting edge 19. The interval E1 is given as 16% with respect to the outer diameter D1 of the cutting edge 19. The width F1 is given as 18% with respect to the outer diameter D1 of the cutting edge 19. A percentage of the angle α1 to the angle β1 is given as 70%.

Example 1.1

Figure 13:
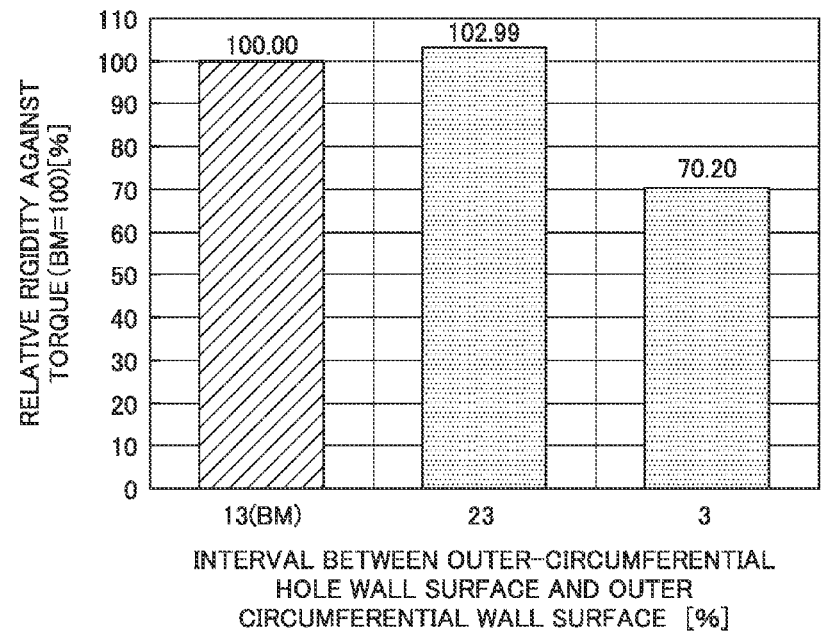
FIG. 13 is a diagram which shows the comparison result of relative rigidity against torque by CAE analysis when a percentage of an interval C1 between an outer-circumference hole wall surface of a coolant hole and an outer-circumference wall surface (an outer circumference flank) with respect to an outer diameter D1 of the cutting edge is changed.
Figure 14:
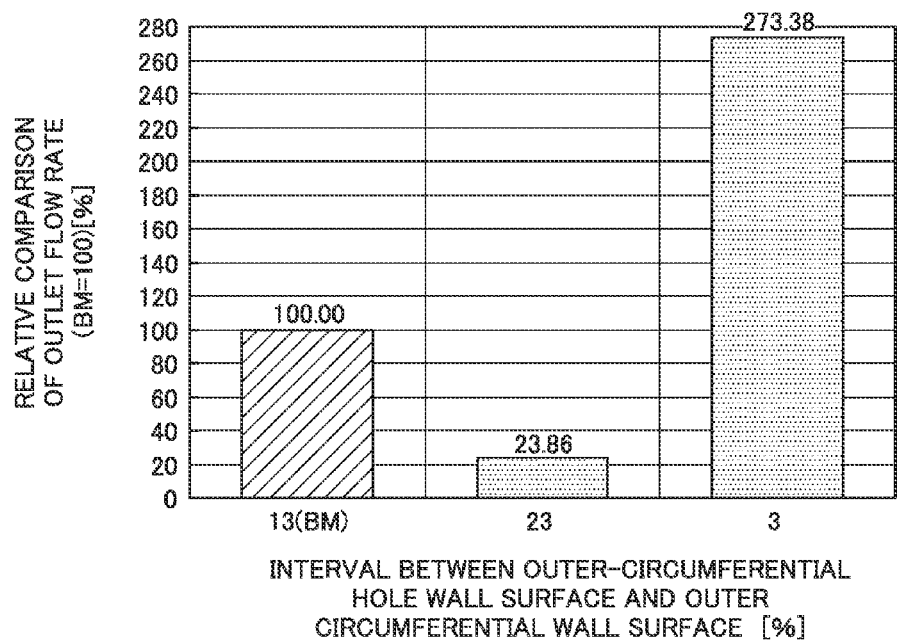
FIG. 14 is a diagram which shows the relative comparison result of outlet flow rate at the coolant hole when a percentage of the interval C1 between the outer-circumference hole wall surface of the coolant hole and the outer-circumference wall surface (the outer circumference flank) with respect to the outer diameter D1 of the cutting edge is changed.

As described above, the interval C1 between the outer-circumference hole wall surface 110C of the coolant hole 110 and the outer-circumference wall surface (the outer circumference flank 18C) is given as 13% with respect to the outer diameter D1 of the cutting edge 19. The example benchmark (BM) is 100%. In this case, in a first comparative example, the interval C1 is given as 23% which is greater than 20% with respect to the outer diameter D1 of the cutting edge 19. In a second comparative example, the interval C1 is given as 3% which is less than 5% with respect to the outer diameter D1 of the cutting edge 19. The example and the comparative examples are subjected to CAE analysis to obtain relative rigidity against torque, the results of which are shown in FIG. 13. Further, the example and the comparative examples are relatively compared for the outlet flow rate at the coolant hole, the results of which are shown in FIG. 14.

Based on the results, in the first comparative example where the interval C1 between the outer-circumference hole wall surface 110C and the outer-circumference wall surface is given as 23% which is larger than the previously described range, the rigidity is increased only by less than 3% as compared with the example. In contrast, the flow rate of the coolant is decreased by as much as 76% or more as compared with the example. In this case, it is not able to obtain sufficient lubrication and cooling effect. In the second comparative example where the interval C1 is given as 3% which is smaller than the previously described range, the flow rate of the coolant is increased by as much as 173% as compared with the example. However, the rigidity is decreased by about 30% as compared with the example. In this case, there is a possibility of breakage during boring work due to lack of rigidity.

Example 1.2

The interval A1 is an interval between the front hole wall surface 110A of the coolant hole 110 and the front groove wall surface 16A of the chip discharging groove 14. The interval B1 is an interval between the rear hole wall surface 110B of the coolant hole 110 and the rear groove wall surface 16B of the chip discharging groove 14. An example benchmark (BM) is 100% when the interval A1 and the interval B1 are both given, as described above, 10% with respect to the outer diameter D1 of the cutting edge 19. In this case, in a first comparative example, the interval A1 and the interval B1 are given as 17% which is greater than 15% with respect to the outer diameter D1 of the cutting edge 19.

Figure 15:
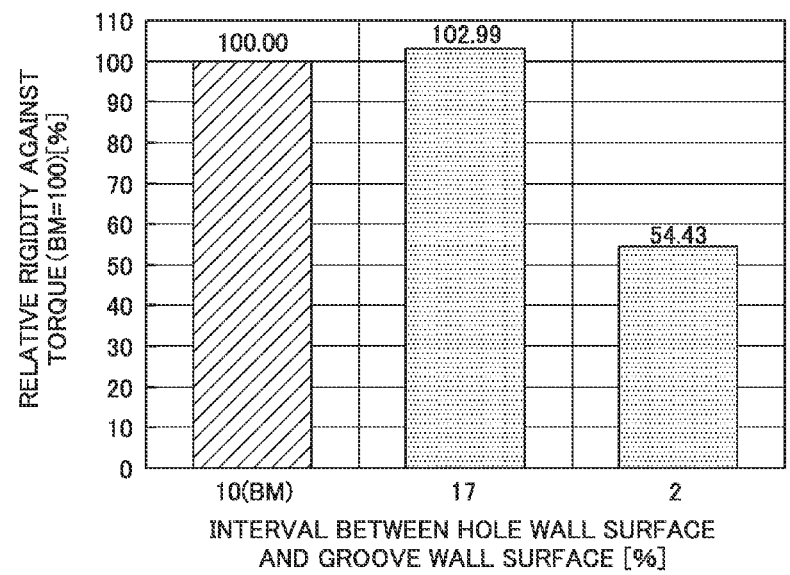
FIG. 15 is a diagram which shows the comparison result of relative rigidity against torque by CAE (Computer Aided Engineering) analysis when a percentage of an interval A1 between a front hole wall surface of the coolant hole and a front groove wall surface of a chip discharging groove with respect to the outer diameter D1 of the cutting edge and a percentage of an interval B1 between a rear hole wall surface of the coolant hole and a rear groove wall surface of the chip discharging groove with respect to the outer diameter D1 of the cutting edge is changed.
Figure 16:
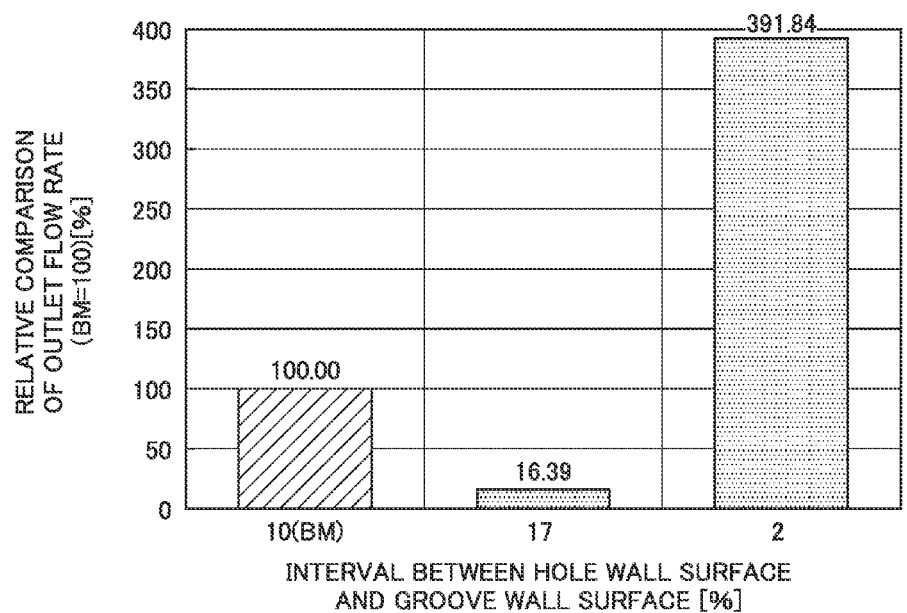
FIG. 16 is a diagram which shows the relative comparison result of outlet flow rate at the coolant hole when the percentage of the interval A1 between the front hole wall surface of the coolant hole and the front groove wall surface of the chip discharging groove with respect to the outer diameter D1 of the cutting edge and the percentage of the interval B1 between the rear hole wall surface of the coolant hole and the rear groove wall surface of the chip discharging groove with respect to the outer diameter D1 of the cutting edge is changed.

In a second comparative example, the interval A1 and the interval B1 are given as 2% which is less than 3%. The example and the comparative examples are subjected to CAE analysis to obtain the relative rigidity against torque, the results of which are shown in FIG. 15. Further, the example and the comparative examples are relatively compared for the outlet flow rate at the coolant hole, the results of which are shown in FIG. 16.

Based on the above results, in the first comparative example where the intervals A1, B1 are both given as 17% which is larger than the previously described range, the rigidity is increased only by less than 3% as compared with the example. In contrast, the flow rate of the coolant is decreased by as much as about 84% as compared with the example. In this case, it is not able to obtain sufficient lubrication and cooling effect. However, in the second comparative example where the intervals A1, B1 are given as 2% smaller than the previously described range, the flow rate of the coolant is increased almost three times as compared with the example. However, the rigidity is decreased by as much as 45% or more as compared with the example. In this case, there is a possibility of breakage during boring work due to lack of rigidity.

Example 1.3

Figure 17:
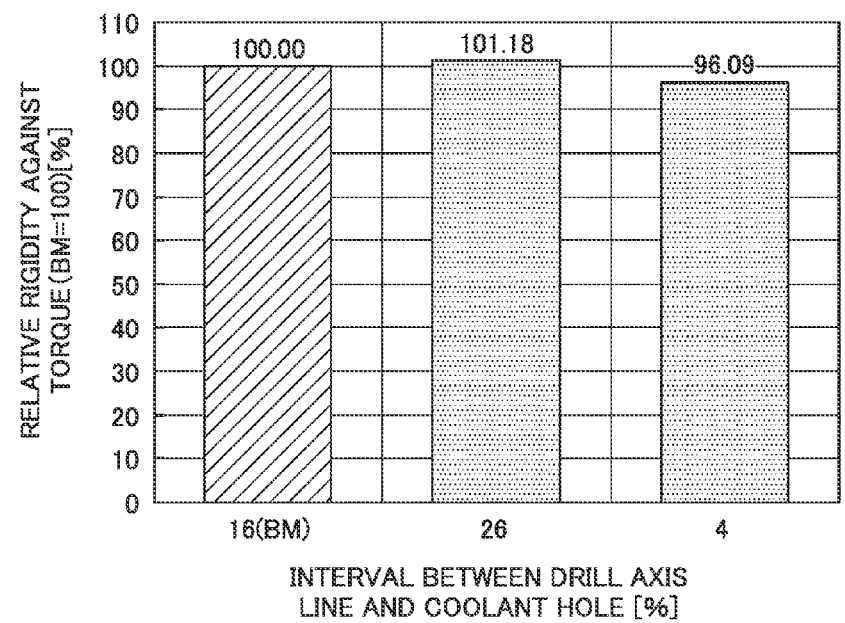
FIG. 17 is a diagram which shows the comparison result of relative rigidity against torque by CAE analysis when a percentage of an interval E1 between the axis line O1 of the drill main body and the coolant hole with respect to the outer diameter D1 of the cutting edge is changed.
Figure 18:
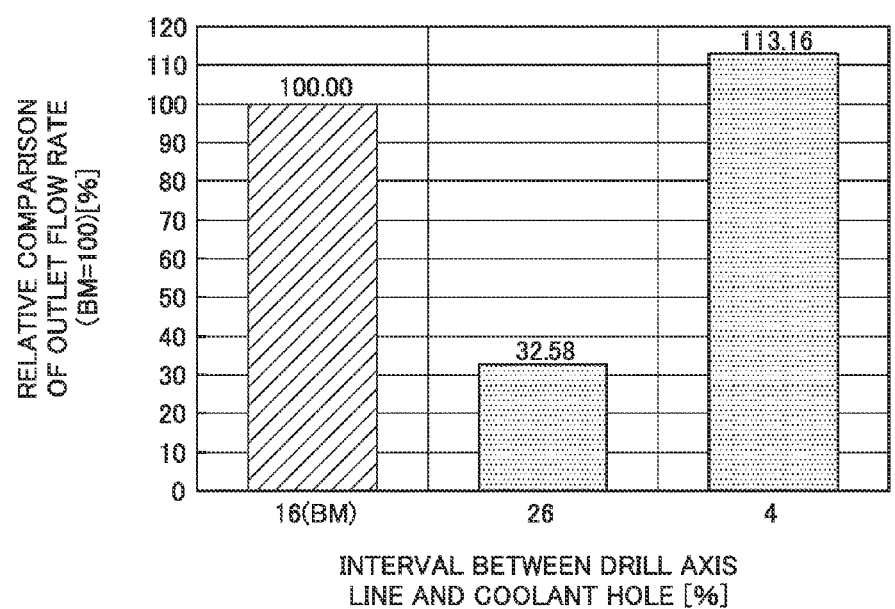
FIG. 18 is a diagram which shows the relative comparison result of outlet flow rate at the coolant hole when the percentage of the interval E1 between the axis line O1 of the drill main body and the coolant hole with respect to the outer diameter D1 of the cutting edge is changed.

An example benchmark (BM) is 100% when the interval E1 between the axis line O1 of the drill main body 11 and the coolant hole 110 is, as described above, given as 16% with respect to the outer diameter D1 of the cutting edge 19. In this case, in a first comparative example, the interval E1 is given as 26% which is greater than 25% with respect to the outer diameter D1 of the cutting edge 19. In a second comparative example, the interval E1 is given as 4% which is less than 5% with respect to the cutting edge 19. The example and the comparative examples are subjected to CAE analysis to obtain relative rigidity against torque, the results of which are shown in FIG. 17. Further, the example and the comparative examples are relatively compared for the outlet flow rate at the coolant hole, the results of which are shown in FIG. 18.

Based on the above results, in the first comparative example where the interval E1 between the axis line O1 and the coolant hole 110 is given as 26% which is greater than the previously described range, the rigidity is substantially the same as compared with the example. In contrast, the flow rate of the coolant is decreased by as much as 67% or more as compared with the example. In this case, it is not able to obtain a sufficient lubrication and cooling effect. However, in the second comparative example where the interval E1 is given as 14% which is smaller than the previously described range, the rigidity is decreased slightly and the flow rate of the coolant is increased slightly as compared with the example. However, there is a possibility of occurrence of cracks between the coolant holes 110 at a web thickness portion.

Example 1.4

Figure 19:
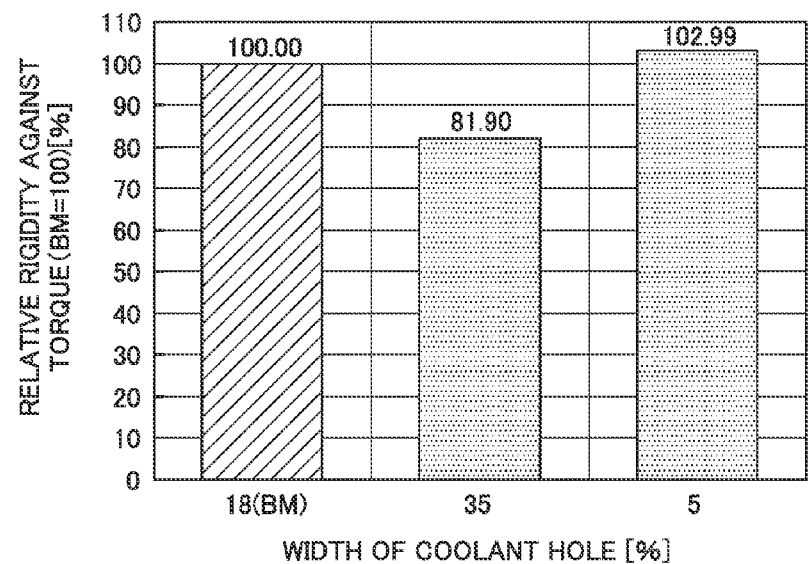
FIG. 19 is a diagram which shows the comparison result of relative rigidity against torque by CAE analysis when a percentage of a width F1 of the coolant hole with respect to the axis line O1 in the radial direction with respect to the outer diameter D1 of the cutting edge is changed.
Figure 20:
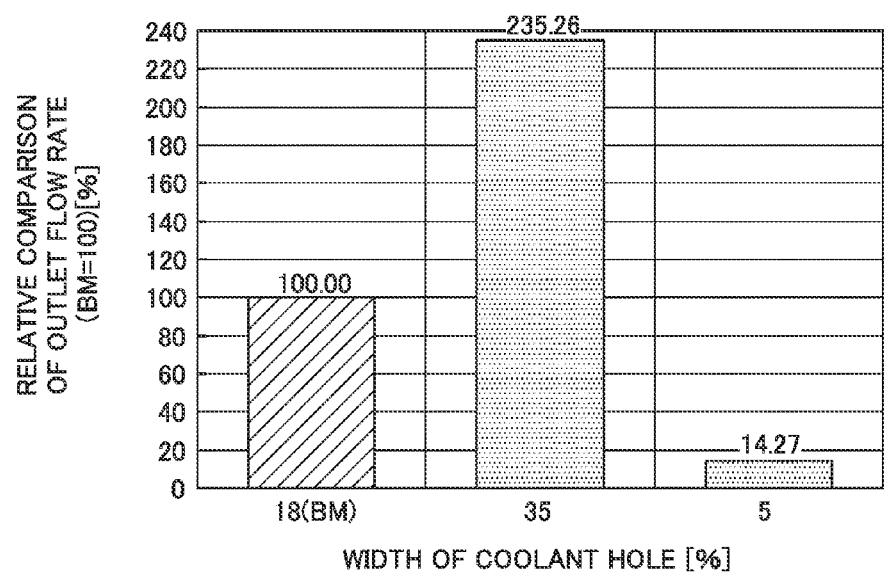
FIG. 20 is a diagram which shows the relative comparison result of outlet flow rate at the coolant hole when the percentage of the width F1 of the coolant hole with respect to the axis line O1 in the radial direction with respect to the outer diameter D1 of the cutting edge is changed.

An example benchmark (BM) is 100% when the width F1 of the coolant hole 110 with respect to the axis line O1 in the radial direction is given, as described above, as 18% with respect to the outer diameter D1 of the cutting edge 19. In this case, a first comparative example, the width F1 is 35% of the outer diameter D1 of the cutting edge 19 which is greater than 30% thereof. Further, in a second comparative example, the width F1 is 5% of the outer diameter D1 of the cutting edge 19 which is less than 10% thereof. The example and the comparative examples are subjected to CAE analysis to obtain the relative rigidity against torque, the results of which are shown in FIG. 19. The example and the comparative example are also compared relatively for the outlet flow rate at the coolant hole, the results of which are shown in FIG. 20.

Based on the above results, in the first comparative example where the width F1 of the coolant hole 110 is 35% of the outer diameter D1 of the cutting edge 19 which is greater than the previously described range, the flow rate of the coolant is increased by as much as 135% compared to the example. However, the rigidity is decreased by 18% or more compared to the example. In this case, there is the possibility of breakage during boring work due to lack of rigidity. In contrast, in the second comparative example where the width F1 of the coolant hole 110 in the radial direction is 5% of the outer diameter D1 of the cutting edge 19 which is smaller than the previously described range, the rigidity is substantially the same as compared with the example. However, the flow rate of the coolant is decreased by as much as 85%. In this case, it is not able to obtain a sufficient lubrication and cooling effect.

Example 1.5

Figure 21:
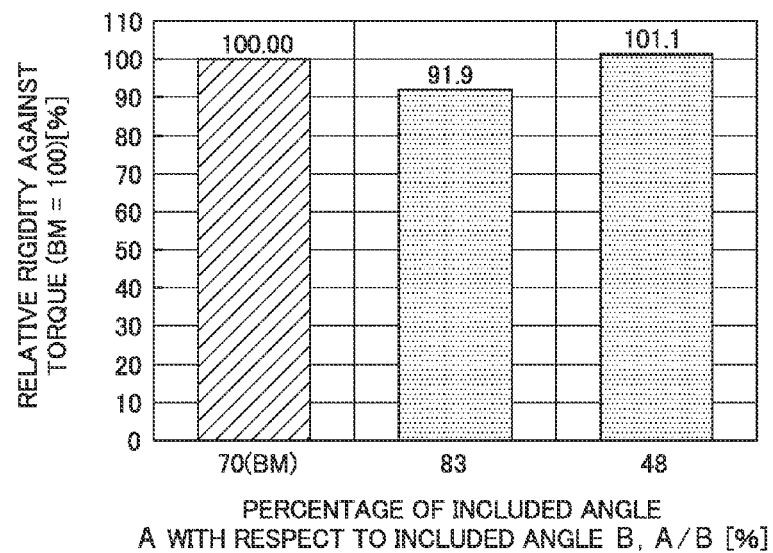
FIG. 21 is a diagram which shows the comparison result of relative rigidity against torque by CAE analysis when on the cross section orthogonal to the axis line O1 of the drill main body, and a percentage of an included angle α1 formed by the front hole wall surface of the coolant hole and the rear hole wall surface thereof with respect to an included angle β1 formed by a straight line connecting an intersection point of the front groove wall surface of the chip discharging groove and the outer-circumference wall surface of the land portion with the axis line O1 and a straight line connecting an intersection point of the rear groove wall surface and the outer-circumference wall surface of the land portion with the axis line O1 is changed.
Figure 22:
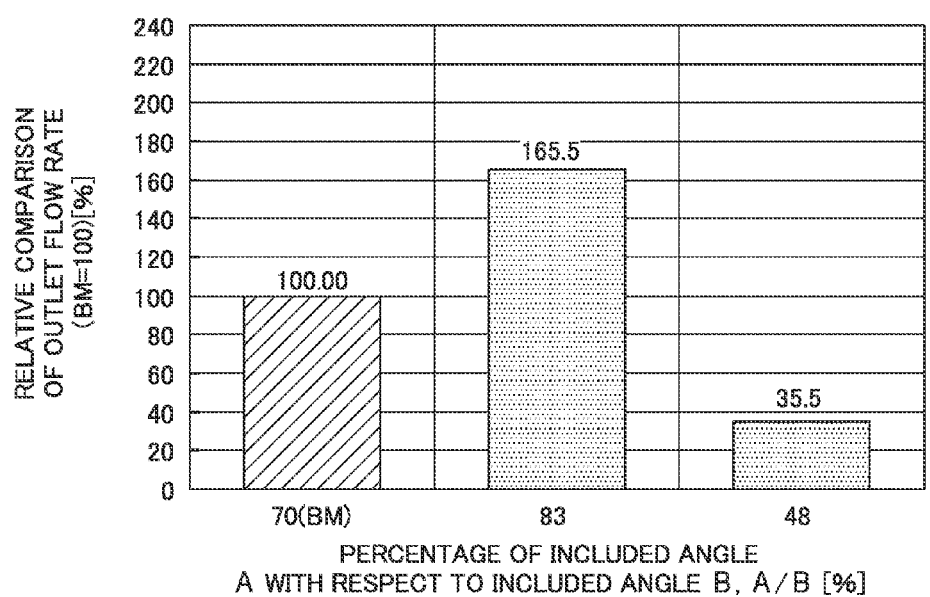
FIG. 22 is a diagram which shows the relative comparison result of outlet flow rate at the coolant hole when on the cross section orthogonal to the axis line O1 of the drill main body, the percentage of the included angle α1 formed by the front hole wall surface of the coolant hole and the rear hole wall surface thereof with respect to the included angle β1 formed by the straight line connecting the intersection point of the front groove wall surface of the chip discharging groove and the outer-circumference wall surface of the land portion with the axis line O1 and the straight line connecting the intersection point of the rear groove wall surface and the outer-circumference wall surface of the land portion with the axis line O1 is changed.

On the cross section orthogonal to the axis line O1 of the drill main body 11, an angle formed by the front hole wall surface 110A of the coolant hole 110 and the rear hole wall surface 110B is given as α1. Further, a straight line connecting an intersection point P1 of the front groove wall surface 16A of the chip discharging groove 14 and the outer-circumference wall surface 18 of the land portion 17 with the axis line O1 is given as M1. Still further, a straight line connecting an intersection point Q1 of the rear groove wall surface 16B and the outer-circumference wall surface 18 of the land portion 17 with the axis line O1 is N1. In addition, an angle formed by the straight line M1 and the straight line N1 is β1. Here, an example benchmark (BM) is 100% when the angle α1 is 70% with respect to the angle β1. In this case, in a first comparative example, a percentage of the angle α1 to β1, that is, α1/β1, is given as 83% which is greater than 80%. In a second comparative example, the percentage of α1/β1 is given as 48% which is less than 50%. The example and the comparative examples are subjected to CAE analysis to obtain the relative rigidity against torque, the results of which are shown in FIG. 21. Further, the example and the comparative examples are relatively compared for the outlet flow rate at the coolant hole, the results of which are shown in FIG. 22.

Based on the above results, in the first comparative example where the percentage of the angle α1 to β1, that is, α1/β1 is given as 83% which is larger than the previously described range, the flow rate of the coolant is increased by as much as 65% or more as compared with the example. However, the rigidity is decreased by 8% or more as compared with the example. In this case, there is the possibility of breakage during boring work due to lack of rigidity. In contrast, in the second comparative example where the percentage of the angle α1 to β1, that is, α1/β1, is given as 48% which is lower than the previously described range, the rigidity is substantially the same as compared with the example. However, the flow rate of the coolant is decreased by as much as 64% or more as compared with the example. In this case, it is not able to obtain sufficient lubrication and cooling effect.

Example 2

Hereinafter, examples will be given with reference to examples that the percentage for increasing the interval between the front hole wall surface 110A of the coolant hole 110 and the rear hole wall surface 110B thereof toward the outer circumferential side in the previously described embodiment is preferably in the range described in this embodiment. In an example, the percentage for increasing the interval is given as 160% which is within the range of the previously described embodiment. A comparative example 1 is provided with a circular coolant hole, the cross section of which is a round hole inscribed in the coolant hole 110 of the example. In a comparative example 2, the percentage for increasing the interval is given as 116% which is less than a lower limit of the range of the previously described embodiment. In a comparative example 3, the percentage for increasing the interval is given as 197% which is greater than an upper limit of the range of the previously described embodiment. The example and the comparative examples are subjected to CAE fluid analysis to analyze the flow rate and pressure loss of the coolant. In this case, the analysis results of the coolant hole with the round hole in the comparative example 1 are given as 100%, by which the example is compared with and the comparative examples.

The fluid analysis is made under the following conditions.

Only one coolant hole 110 with the length of 85 mm in the direction of the axis line O1 is analyzed in the case of the drill which is 6 mm in outer diameter D1 of the cutting edge 19. Water is used as coolant. The coolant is supplied at a pressure of 3 MPa, and the opening portion of the coolant hole 110 is kept at an atmospheric pressure. Under the above conditions, the fluid analysis is conducted to analyze the flow rate and pressure loss. Here, the width F1 of the coolant hole 110 in the example is given as 18% with respect to the outer diameter D1 of the cutting edge 19. Further, the percentage of the angle α1 to the angle β1 in the example is given as 70%.

Further, in the comparative examples 2, 3 where the percentages for increasing the intervals are respectively greater than the lower limit and the upper limit of the range of the previously described embodiment, the following conditions are used.

The interval between both ends of the recessed curve portion 110D at a part where the front hole wall surface 110A and the rear hole wall surface 110B intersect with each other (the interval W11 in FIG. 6) and the width F1 of the coolant hole 110 are made as the same as those of the example. Still further, the percentage for increasing the interval between the front hole wall surface 110A and the rear hole wall surface 110B with every increase of L1=1 mm is given as 116% in the comparative example 2 and given as 197% in the comparative example 3.

Table 1 covers the following items of the example and the comparative examples 1 to 3: that is, an external appearance of cross sectional shape of the coolant hole 110; a percentage for increasing the interval between the front hole wall surface 110A and the rear hole wall surface 110B toward the outer circumferential side (excluding the comparative example 1); a cross sectional area of the coolant hole 110; a circumferential length of the coolant hole 110; and a cross-sectional area ratio of the coolant hole 110 when the comparative example 1 is given as 100%.

Figure 23:
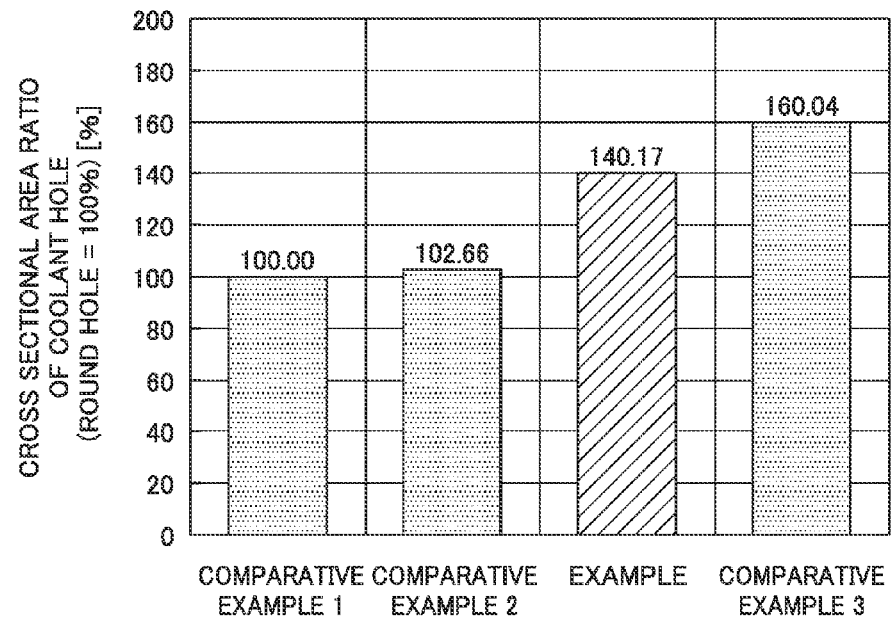
FIG. 23 is a diagram which shows a ratio of the cross sectional area of the coolant hole in each of the example of the present invention and comparative examples 1 to 3.
Figure 24:
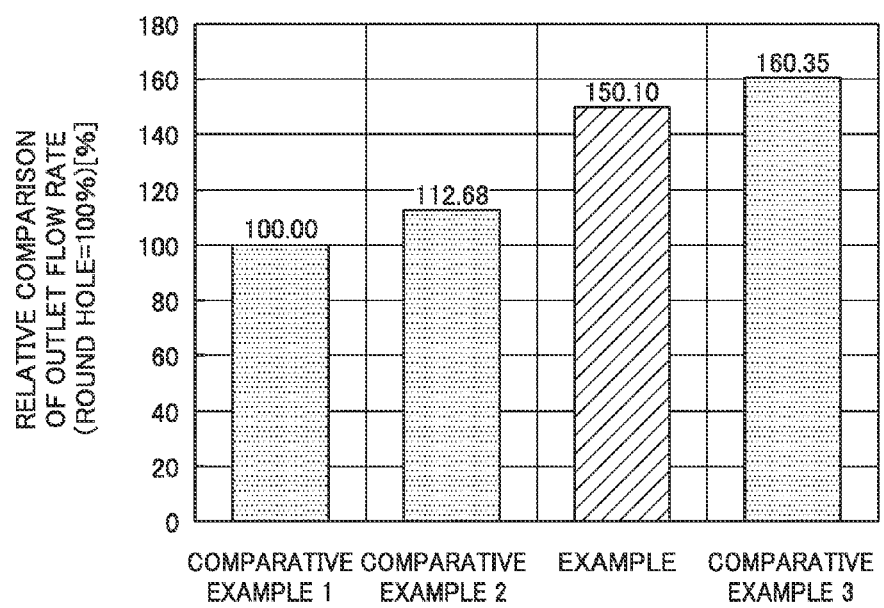
FIG. 24 is a diagram which relatively compares a flow rate at the coolant hole in each of the example of the present invention and the comparative examples 1 to 3.
Figure 25:
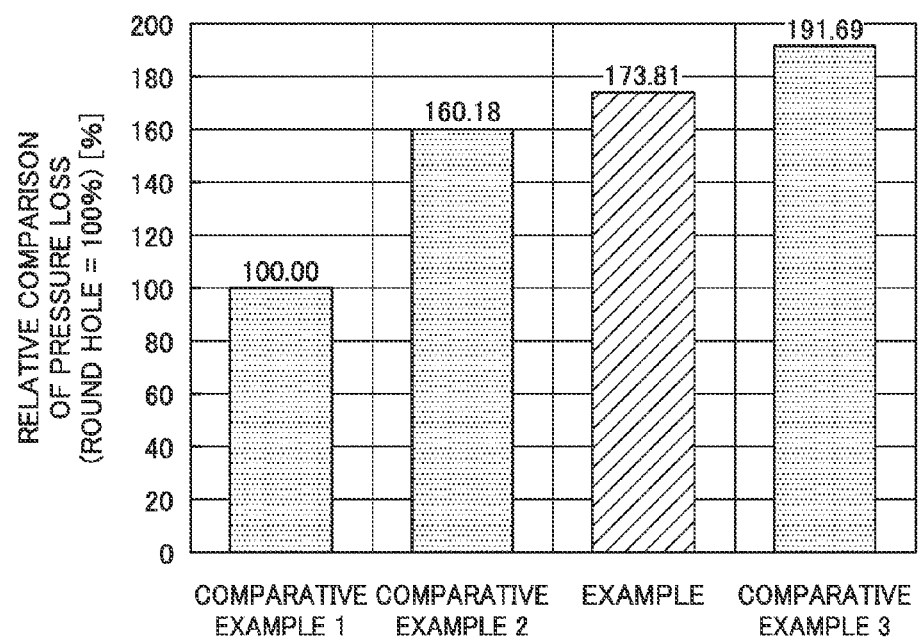
FIG. 25 is a diagram which relatively compares the pressure loss of coolant in each of the example of the present invention and the comparative examples 1 to 3.

The cross-sectional area ratio, the coolant flow rate and pressure loss in the example and the comparative examples 1 to 3 are also shown in FIG. 23 to FIG. 25.

TABLE 1

|  | COMPARATIVE EXAMPLE 1 ROUND HOLE (INSCRIBED CIRCLE OF THE EXAMPLE) | COMPARATIVE EXAMPLE 2 | EXAMPLE | COMPARATIVE EXAMPLE 3 |
| --- | --- | --- | --- | --- |
| EXTERNAL APPEARANCE OF COOLANT HOLE | ○ | ◯ | ◁ | ◁ |
| PERCENTAGE OF INTERVAL INCREASE | — | 116% | 160% | 197% |
| CROSS SECTIONAL AREA OF COOLANT HOLE | 3.801 mm$^2$ | 3.902 mm$^2$ | 5.328 mm$^2$ | 6.083 mm$^2$ |
| CIRCUMFERENTIAL LENGTH OF COOLANT HOLE | 6.912 mm | 7.365 mm | 8.615 mm | 9.284 mm |
| CROSS-SECTIONAL AREA RATIO | 100% | 103% | 140% | 160% |
| COOLANT FLOW RATIO | 100% | 113% | 150% | 160% |

Based on the above results, not only in the comparative example 1 but also in the comparative example 2 where the percentage for increasing the interval between the front hole wall surface 110A and the rear hole wall surface 110B is smaller than the previously described range, the pressure loss of the coolant is small. However, an absolute cross sectional area of the coolant hole 110 is small. Therefore, the flow rate of the coolant is accordingly small. As a result, sufficient cooling and lubrication may be prevented at the cutting edge 19 and a cut site of a workpiece, or favorable discharge of chips may be inhibited. In contrast, in the comparative example 3 where the percentage for increasing the interval between the front hole wall surface 110A and the rear hole wall surface 110B is greater than the previously described range, the cross sectional area of the coolant hole 110 and the flow rate are greater than those of the example. However, as shown in FIG. 25, an increment of the pressure loss is greater than an increment of the flow rate as compared with the example. In this case, the pressure for ejecting coolant from the opening portion is insufficient, by which efficient supply of the coolant is prevented.

In the example, the cross sectional area of the coolant hole 110 and the coolant flow rate are greater than the comparative examples 1, 2. On the other hand, the pressure loss is not made as great as compared with the comparative example 3. Therefore, it is possible to efficiently increase the coolant flow rate and sufficiently supply coolant to the cutting edge 19 and a cut site of a workpiece. As a result, it is possible to reliably cool and lubricate them and also discharge chips smoothly.

A description has been so far made for preferred embodiments of the present invention, to which the present invention shall not be, however, restricted. The present invention may be subjected to addition, omission, replacement and other modifications of the configuration within a scope not departing from the gist of the present invention. The present invention shall not be restricted to the above description but will be restricted only by the scope of the attached claims.

INDUSTRIAL APPLICABILITY

The present invention relates to a coolant-hole equipped drill in which a coolant hole for supplying coolant such as cutting oil is formed at a cutting edge portion of a tip portion of a drill main body for boring work.

The present invention is to provide a coolant-hole equipped drill which is capable of reliably supplying coolant in an increased amount without reducing the strength of the drill main body and also capable of efficient and stable boring of a difficult cutting material such as stainless steel.

DESCRIPTION OF REFERENCE NUMERALS

11: drill main body
13: cutting edge portion
14: chip discharging groove
15: tip flank
16: groove wall surface of chip discharging groove 14
16A: front groove wall surface
16B: rear groove wall surface
17: land portion
18: outer-circumference wall surface
18A: margin portion
18C: outer circumference flank
19: cutting edge
110: coolant hole
110A: front hole wall surface
110B: rear hole wall surface
110C: outer-circumference hole wall surface
O1: axis line of drill main body 11
T1: drill rotating direction
A1: interval between front hole wall surface 110A and front groove wall surface 16A
B1: interval between rear hole wall surface 110B and rear groove wall surface 16B
C1: interval between outer-circumference hole wall surface 110C and outer-circumference wall surface 18 (outer circumference flank 18C)
D1: outer diameter of cutting edge 19
E1: interval between axis line O1 and coolant hole 110
F1: width of coolant hole 110 with respect to axis line O1 in radial direction
G1: greatest width of coolant hole 110 in circumferential direction
W11-W13: intervals between front and rear hole wall surfaces 110A, 110B of coolant hole 110 in the circumferential direction
α1: angle formed by front hole wall surface 110A and rear hole wall surface 110B on cross section orthogonal to the axis line O1
β1: angle formed by straight line M1 connecting intersection point P1 of front groove wall surface 16A and outer-circumference wall surface 18 with the axis line O1 and straight line N1 connecting intersection point Q1 of rear groove wall surface 16B and outer-circumference wall surface 18 with axis line O1 on cross section orthogonal to axis line O1
21: drill main body
23: cutting edge portion
24: chip discharging groove
25: tip surface
25A, 25B: first and second flank portions
25C: second thinning surface
26: groove wall surface of chip discharging groove 24
26A: front groove wall surface
26B: rear groove wall surface
26D: first thinning surface
27: land portion
28: outer-circumference wall surface
28A-28C: first to third margin portions
28D, 28E: first and second body clearances
29: cutting edge
29A: thinning blade
210: coolant hole
210A: front hole wall surface
210B: rear hole wall surface
210C: outer-circumference hole wall surface
O2: axis line of drill main body 21
T2: drill rotating direction
A2: interval between front hole wall surface 210A and front groove wall surface 26A
B2: interval between rear hole wall surface 210B and rear groove wall surface 26B
C2: interval between outer-circumference hole wall surface 210C and outer-circumference wall surface 28 (first and second body clearances 28D, 28E)
D2: outer diameter of cutting edge 29
E2: interval between axis line O2 and coolant hole 210
F2: width of coolant hole 210 with respect to axis line O2 in radial direction
G2: greatest width of coolant hole 210 in circumferential direction
S2: two straight lines which pass through axis line O2 and circumscribe opening portion of coolant hole 210 so as to hold opening portion in the circumferential direction when viewed from tip side in direction of axis line O2
W21-W23: intervals between front hole wall surface 210A of coolant hole 210 and rear hole wall surface 210B thereof in circumferential direction
α2: angle formed by front hole wall surface 210A and rear hole wall surface 210B on cross section orthogonal to axis line O2
β2: angle formed by straight line M2 connecting intersection point P2 of front groove wall surface 26A and outer-circumference wall surface 28 with axis line O2 and straight line N2 connecting intersection point Q2 of rear groove wall surface 26B and outer-circumference wall surface 28 with axis line O2 on cross section orthogonal to axis line O2

The invention claimed is:

1. A coolant-hole equipped drill comprising:
a drill main body which is configured to rotate around an axis line during operation;
a cutting edge portion which has a tip flank formed at a tip side of the drill main body;
a plurality of chip discharging grooves, each of which is formed at an outer circumference of the cutting edge portion and provided with a front groove wall surface facing forward in the rotating direction of the drill main body;
a cutting edge which is formed at a ridge line portion where the front groove wall surface of the chip discharging groove and the tip flank of the cutting edge portion intersect with each other and in which an inner circumferential portion of the front groove wall surface is subjected to thinning;
a thinning blade formed by the thinning at an inner circumferential portion of the cutting edge;
a first thinning surface formed by the thinning at an inner circumferential portion of a tip side part of the front groove wall surface and formed forward of the thinning blade in the rotating direction;
a second thinning surface which is provided behind the tip flank in the rotating direction and inclined to the tip flank by the thinning so as to move backward to the base end of the drill main body, and which is formed forward of the first thinning surface in the rotating direction;
a coolant hole which is provided at the cutting edge portion so as to be opened at the tip flank and is constant in shape and dimension on a cross section orthogonal to the axis line over an entire length of the drill main body; and
a land portion which is provided between the chip discharging grooves adjacent to each other in the rotating direction, wherein
a first margin portion, a second margin portion and a third margin portion are formed on an outer-circumference wall surface of the land portion, so as to have intervals between each other in the rotating direction,
the first margin portion is provided behind the cutting edge in the rotating direction,
the second margin portion is provided behind the first margin portion in the rotating direction and intersects with the tip flank between two straight lines which pass through the axis line and circumscribe an opening portion of the coolant hole so as to hold the opening portion between two straight lines when viewed from the axis line of the drill main body, and
the third margin portion is provided behind the second margin portion in the rotating direction and at least a part backward in the rotating direction intersects with the tip flank, a tip of the third margin portion intersects with the second thinning surface, a part of the third margin portion forward in the drill rotating direction intersects with the second flank portion, and a part of the third margin portion backward in the drill rotating direction intersects with the second thinning surface, and
wherein the coolant hole includes:
a front hole wall surface which is positioned forward in the rotating direction of the drill main body;
a rear hole wall surface which is positioned backward in the rotating direction of the drill main body; and
an outer-circumference hole wall surface which is positioned on the outer circumferential side of the drill main body, and
wherein intervals between the front hole wall surface of the coolant hole and the rear hole wall surface thereof in the circumferential direction are gradually increased toward the outer circumferential side, a percentage for increasing the intervals between the front hole wall surface and the rear hole wall surface is gradually increased toward the outer circumferential side, and the front hole wall surface and the rear hole wall surface are formed in such a manner that both the cross sections are formed in a curved shape which is convex inside the coolant hole on the cross section orthogonal to the axis line, and
wherein parts at which the front hole wall surface, the rear hole wall surface and the outer-circumference hole wall surface intersect each other are smoothly connected by recessed curve portions.

2. The coolant-hole equipped drill according to claim 1, wherein the third margin portion is greater in width in the rotating direction than the first margin portion and the second margin portion.

3. The coolant-hole equipped drill according to claim 1, wherein the second margin portion is smaller in width in the rotating direction than the first margin portion and the third margin portion.

4. The coolant-hole equipped drill according to claim 1, wherein the chip discharging groove has a rear groove wall surface which is positioned backward in the rotating direction and faces backward in the rotating direction, and
the coolant hole includes:
a front hole wall surface which is positioned forward in the rotating direction and constant in interval with the front groove wall surface of the chip discharging groove;
a rear hole wall surface which is positioned backward in the rotating direction and constant in interval with the rear groove wall surface of the chip discharging groove; and
an outer-circumference hole wall surface which is positioned on the outer circumferential side of the drill main body and constant in interval with a part of the outer-circumference wall surface of the land portion excluding the first, the second and the third margin portions.

* * * * *